United States Patent
Lee et al.

(10) Patent No.: US 11,419,470 B2
(45) Date of Patent: Aug. 23, 2022

(54) CLEANER

(71) Applicant: LG ELECTRONICS INC., Seoul (KR)

(72) Inventors: Seungjin Lee, Seoul (KR); Sangik Lee, Seoul (KR); Sangjo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 416 days.

(21) Appl. No.: 16/264,886

(22) Filed: Feb. 1, 2019

(65) Prior Publication Data

US 2019/0239710 A1    Aug. 8, 2019

(30) Foreign Application Priority Data

Feb. 5, 2018   (KR) .......................... 10-2018-0014158

(51) Int. Cl.
*A47L 9/28*      (2006.01)
*G05D 1/02*      (2020.01)
(Continued)

(52) U.S. Cl.
CPC ............. *A47L 9/2826* (2013.01); *A47L 9/009* (2013.01); *A47L 9/2852* (2013.01); *A47L 9/2873* (2013.01); *G05D 1/0225* (2013.01); *A47L 2201/02* (2013.01); *A47L 2201/022* (2013.01); *A47L 2201/06* (2013.01); *G05D 1/0231* (2013.01); *G05D 1/08* (2013.01); *G05D 2201/0215* (2013.01); *Y10S 901/00* (2013.01)

(58) Field of Classification Search
CPC ...... A47L 9/2826; A47L 9/009; A47L 9/2852; A47L 9/2873; A47L 2201/02; Y10S 901/00

USPC ....................................................... 280/5.514
See application file for complete search history.

(56) References Cited

U.S. PATENT DOCUMENTS

| 2012/0037862 A1* | 2/2012 | McCarthy | ................. B60P 3/32 254/1 |
| 2013/0340201 A1* | 12/2013 | Jang | ........................ A47L 9/009 15/319 |

FOREIGN PATENT DOCUMENTS

| CN | 108146182 A | * | 6/2018 |
| JP | 2000-202792 | | 7/2000 |

(Continued)

OTHER PUBLICATIONS

International Search Report dated May 23, 2019.
Taiwan Office Action dated Dec. 17, 2019.

*Primary Examiner* — Orlando E Aviles
*Assistant Examiner* — Thomas Raymond Rodgers
(74) *Attorney, Agent, or Firm* — KED & Associates LLP

(57) ABSTRACT

A cleaner may include a main body configured to be ascendable and descendable with respect to a suspension assembly provided to absorb shocks applied to a wheel assembly, thereby enabling the suspension assembly to continuously absorb shocks even when the height of the main body is adjusted. The cleaner may further include a charging terminal configured to connect to an external docking device to charge the cleaner and provided on a bottom surface of the main body, a drive assembly including a wheel assembly to drive the main body, a height adjuster coupled to the main body to ascend or descend together with the main body and mounted to the drive assembly so as to be ascendable and descendable, and a controller to ascend the height adjuster and raise the main body when the main body is set to be docked with the docking device.

15 Claims, 9 Drawing Sheets

(51) Int. Cl.
    *A47L 9/00*         (2006.01)
    *G05D 1/08*         (2006.01)

(56) References Cited

FOREIGN PATENT DOCUMENTS

| | | |
|---|---|---|
| JP | 2009-66391 | 4/2009 |
| JP | 10-1018720 | 3/2011 |
| JP | 10-2015-0107234 | 9/2015 |
| JP | 2016-051342 | 4/2016 |
| TW | 201706097 | 2/2017 |

\* cited by examiner

CLEANER

CROSS-REFERENCE TO RELATED APPLICATION(S)

This application claims the priority benefit of Korean Patent Application No. 10-2018-0014158, filed on Feb. 5, 2018 in the Korean Intellectual Property Office, the disclosure of which is incorporated herein by reference.

BACKGROUND

1. Field

The present invention relates to a cleaner capable of selectively performing automatic cleaning or manual cleaning.

2. Background

In general, a cleaner may include a cleaner body having a suction unit or device and a dust container, and a cleaning nozzle connected to the cleaner body to clean an area in contact with the cleaning nozzle. Cleaners may generally be classified into manual cleaners used by a user to manually clean an area, and automatic cleaners that clean while traveling autonomously on an area to be cleaned.

In a manual cleaner, a suction force may be generated in a suction device by the power of an electric motor. When a user grips a cleaning nozzle or a cleaner body with his hand and puts the cleaning nozzle on an area to be cleaned (e.g., a couch or a floor or ground surface), foreign substances such as dust may be sucked into the cleaning nozzle by the suction force and collected in a dust container. A cleaning operation of the manual cleaner may thus be performed by a user.

An automatic cleaner may also include a suction device, a dust container, a cleaner body, and a cleaning nozzle. In addition, the automatic cleaner may include an ultrasonic sensor and/or a camera sensor mounted on the cleaner body. While the cleaner body travels autonomously on the floor using the ultrasonic sensor and/or the camera sensor, foreign substances in the area may be sucked into the cleaning nozzle by a suction force generated in the suction device and collected in the dust container. A cleaning operation of the automatic cleaner may thus be performed autonomously. The cleaning nozzle of the manual cleaner may be moved by the user and brought into close contact with the floor, whereas the cleaning nozzle of the automatic cleaner may be coupled to the cleaner body so as to be brought into close contact with the floor.

Each of the manual cleaner and the automatic cleaner may further include wheels mounted to the cleaner body to allow the cleaner body to move. Wheels mounted to the manual cleaner may enable a user to easily pull or move the cleaner body across the area to be cleaned. Wheels mounted to the automatic cleaner may be rotated by a drive force generated in an electric motor, allowing the cleaner body to travel autonomously.

Recently, cleaners capable of selectively performing automatic cleaning or manual cleaning have been developed. Regardless of whether an automatic cleaner is configured to perform only automatic cleaning or to also perform manual cleaning, when the cleaner is operated in an automatic cleaning mode, the cleaning nozzle is maintained in close contact with an area to be cleaned while the cleaner body is traveling. However, the area on which the cleaner travels may vary greatly (e.g., in texture, height, or dirtiness), which may influence how the cleaner travels.

For example, a living room floor may be covered with a carpet, and fibers of the carpet may be drawn into a suction port by the suction force of the cleaning nozzle. This suction force applied between the carpet and the suction port may prevent the cleaner from traveling smoothly. In addition, the wheels of an automatic cleaner may slip due to the fibers of the carpet, preventing the cleaner from travelling normally. Furthermore, the cleaning nozzle may be stuck in the carpet, and thus a large amount of friction may be generated between the cleaning nozzle and the carpet and prevent the cleaner from travelling normally.

The cleaner may be further equipped with a battery that stores electrical or chemical energy. In a recently developed cleaner, when a charge of the battery drops below a predetermined charge level during an automatic cleaning mode, the cleaner may travel autonomously to a charging stand and may be automatically docked with the charging stand to charge the battery.

In a cleaner capable of selectively performing automatic cleaning or manual cleaning, the charging stand may charge the battery using a high voltage of 72V. For safety reasons, the charging stand may be configured such that the charging terminals may not be exposed during certain times and may be exposed only when the cleaner is docked. For this reason, it is very important for the cleaner to be docked automatically and securely.

A cleaner body may be configured to ascend or descend to adjust the suction force of the cleaning nozzle with respect to a varying area to be cleaned, and also to allow the cleaner body to be automatically docked with the high voltage charging stand.

A conventional cleaner may be configured such that a wheel assembly including wheels ascends or descends, and consequently a cleaner body mounted on the wheel assembly ascends or descends. The cleaner body may ascend or descend along with a vertical movement of the wheel assembly.

When the cleaner is equipped with a suspension assembly or device to absorb shocks applied to the wheel assembly, the wheel assembly may be mounted to the suspension assembly so as to be vertically movable. However, when the wheel assembly ascends or descends in order to move the cleaner body upwards or downwards, the shock-absorbing performance of the suspension assembly may be degraded.

BRIEF DESCRIPTION OF THE DRAWINGS

Embodiments will be described in detail with reference to the following drawings in which like reference numerals refer to like elements, and wherein.

DETAILED DESCRIPTION

Figure 1:
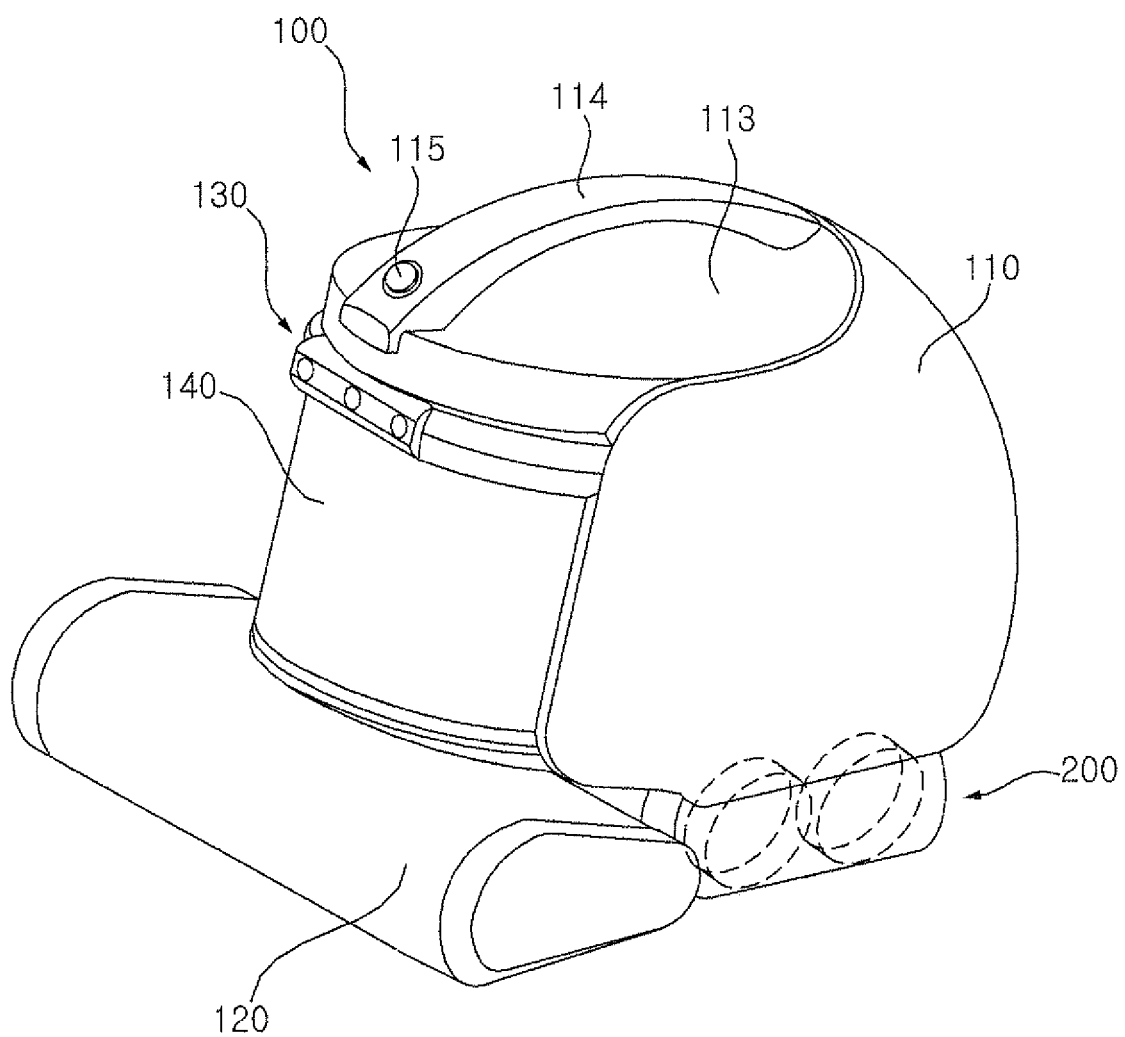
FIG. 1 is a perspective view illustrating a cleaner according to an embodiment.

Advantages and features of the present invention and methods for achieving them will be made clear from embodiments described below in detail with reference to the accompanying drawings. The present invention may, however, be embodied in many different forms, and should not be construed as being limited to the embodiments set forth herein. Rather, these embodiments are provided so that this disclosure will be thorough and complete, and will fully convey the scope of the invention to those skilled in the art. The present invention is defined only by the scope of the claims. Throughout the specification, the same reference numerals represent the same components.

Hereinafter, a cleaner according to an embodiment will be described with reference to the accompanying drawings. FIG. 1 is a perspective view illustrating a cleaner according to an embodiment, and FIG. 2 is a view illustrating the cleaner from which a dust container depicted in FIG. 1 is separated.

Figure 2:
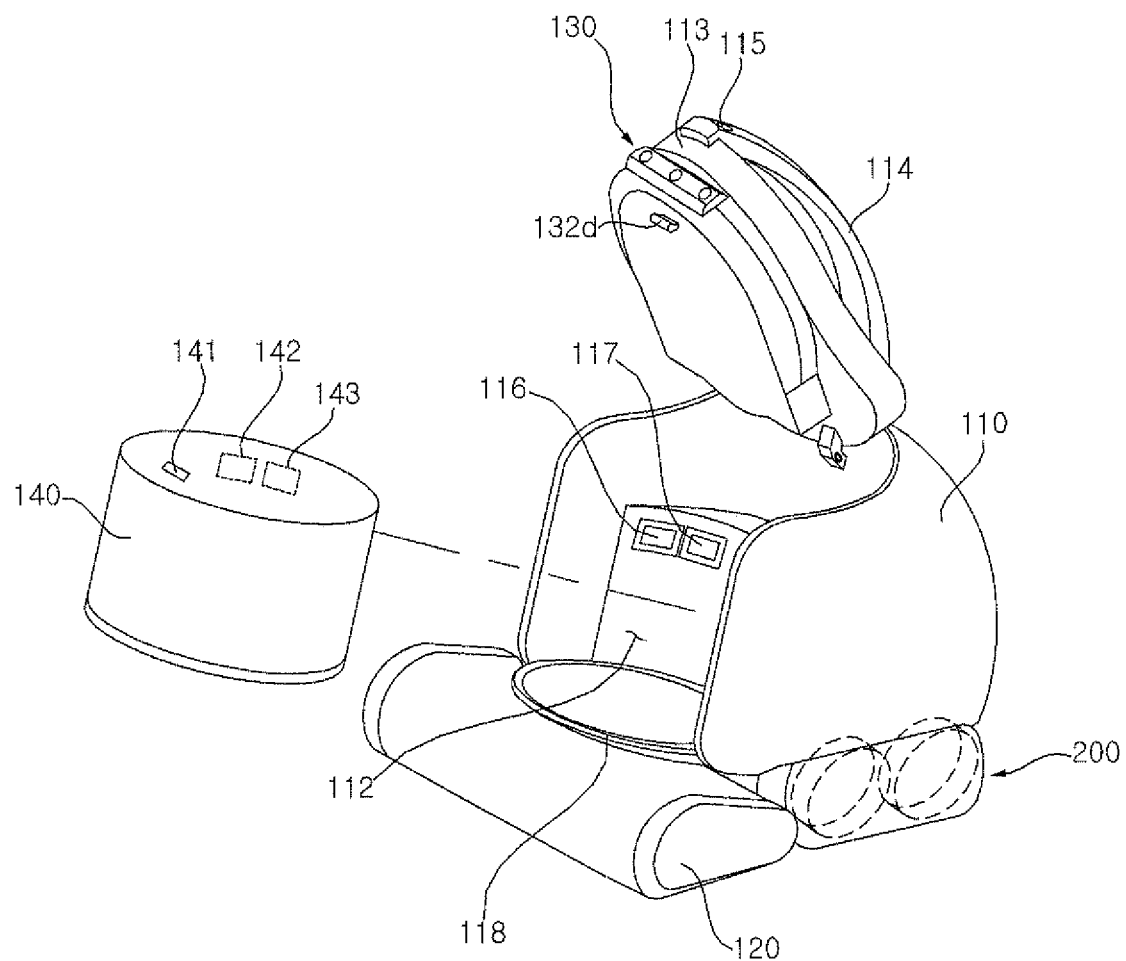
FIG. 2 is a view illustrating the cleaner from which a dust container depicted in FIG. 1 is separated.

Referring to FIGS. 1 and 2, a cleaner 100 may include a cleaner body or a main body 110, a cleaning nozzle or nozzle 120, a sensor 130, and a dust container or bin 140. The cleaner 100 may further include various components such as a controller 5 (FIG. 9) to control the cleaner 100, which are embedded in or mounted on the main body 110. The main body 110 may have therein a space formed to accommodate various components, which constitute the cleaner 100, therein.

The main body 110 may be configured to travel in one of an automatic mode or a manual mode depending on a user's selection. The main body 110 may be provided with a mode selection input device or mode input device (not shown) through which a user may select one of the automatic mode or the manual mode. As an alternative, the mode input device may be provided on a remote controller or external docking device 3 separate from the main body 110. When the user selects the automatic mode using the mode input device, the main body 110 may travel autonomously like a robot cleaner. When the user selects the manual mode using the mode input device, the main body 110 may travel by being manually drawn or pushed by the user.

The main body 110 may be provided with a wheel assembly 200 that allows the main body 110 to travel. The wheel assembly 200 may include a travel drive motor or a wheel motor (210 in FIG. 4) and at least one wheel or roller (e.g., 221 or 222 in FIG. 4) configured to be rotated by a torque of the wheel motor 210. A rotational direction of the wheel motor 210 may be controlled by the controller 5 (FIG. 9), and the at least one wheel 210 of the wheel assembly 200 may be rotated in a first direction or a second direction opposite the first direction depending on the rotational direction of the motor. Details of the wheel motor 210 and the wheel 221 will be provided with reference to FIGS. 3-6.

A wheel assembly 200 may be provided at each of first and second sides, e.g., left and right sides, of the main body 110. The main body 110 may be moved or turned in all directions by the wheel assembly 200, Each wheel assembly 200 may be configured to be operated independently. Each wheel assembly 200 may be individually operated by a corresponding motor, such as the wheel motor 210. The controller 5 may control the operation of the wheel assembly 200 so that the cleaner 100 can travel autonomously on an area to be cleaned, e.g., a floor.

Figure 3:
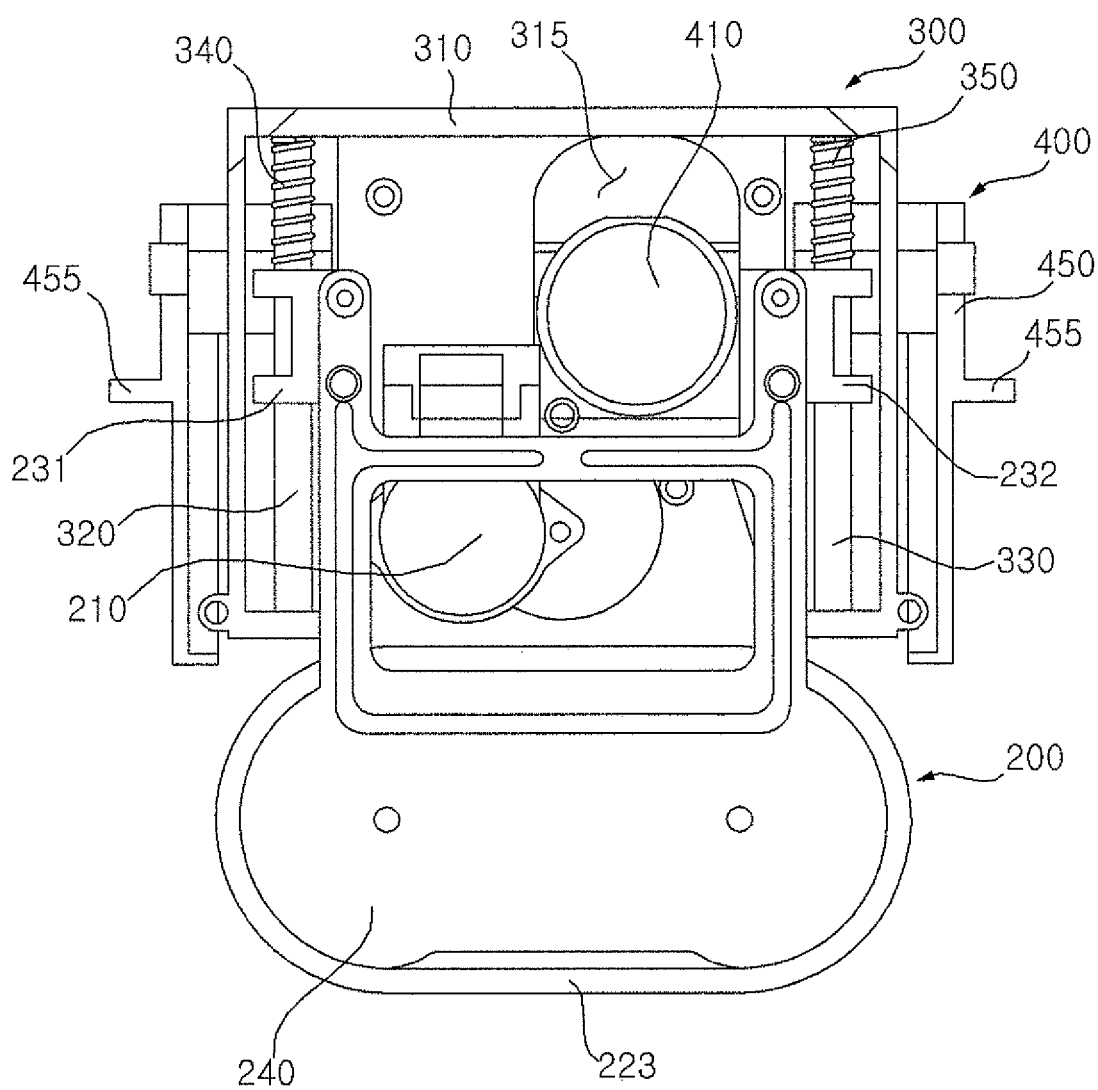
FIG. 3 is a front view illustrating a wheel assembly depicted in FIGS. 1 and 2, a suspension assembly coupled to the wheel assembly, and a height adjuster mounted to the suspension assembly.

The wheel assembly 200 may be provided at a lower side or bottom of the main body 110 so as to drive the main body 110. The wheel assembly 200 may be constituted by any combination of circular wheels and/or rollers 221 and/or 222 connected via a belt chain or travel belt 223 (FIG. 3). The at least one wheel or roller 221 or 222 of the wheel assembly 200 may be arranged such that an upper portion of the wheel 221 is located inside the main body 110, and a lower portion of the wheel 221 is exposed to an outside of the main body 110. The lower portion of the wheel 221 of the wheel assembly 200 may be maintained in contact with the floor, thereby driving the main body 110.

A wheel assembly 200 may be mounted to each of the first and second sides of the main body 110. The wheel assembly 200 mounted to the first side of the main body 110 may be referred to as a first wheel assembly 200, and the wheel assembly 200 mounted to the second side of the main body 110 may be referred to as a second wheel assembly 200. The first wheel assembly 200 may be operated independently from the second wheel assembly 200.

The first wheel assembly 200 may be connected to a first drive motor or first wheel motor 210 via at least one first gear (not shown). The first gear may be rotated by a torque of the first wheel motor 210, and the first wheel assembly 200 (i.e., a wheel 221 of the first wheel assembly 200) may also be rotated along with the rotation of the first gear. The second wheel assembly 200 may be connected to a second drive motor or second wheel motor 210 via at least one second gear (not shown). The second gear may be rotated by a torque of the second wheel motor 210, and the second wheel assembly 200 (i.e., a wheel 221 of the second wheel assembly 200) may also be rotated along with the rotation of the second gear. There may be a plurality of gears such that a rotation of the first and second wheel motors 210 ultimately drive a rotation of the wheels 221 of the first and second wheel assemblies 200.

The controller 5 may control a rotational speed of a rotary shaft (not labeled) of each of the first and second wheel motors 210 so as to determine the direction in which the main body 110 travels. For example, when the controller 5 controls the wheel assemblies 200 such that the rotary shafts of the first and second wheel motors 210 are simultaneously rotated at the same rotational speed as each other, the main body 110 may travel straight.

When the controller 5 controls the wheel assemblies 200 such that the rotary shafts are simultaneously rotated at different rotational speeds from each other, the main body 110 may turn toward first and second directions, e.g., toward the left or right. To control the main body 110 to turn to the left or right, the controller 5 may operate only one of the first and second drive motors. For example, the controller 5 may operate the first wheel motor 210 and stop an operation of the second wheel motor 210, and vice versa.

The cleaner 100 may further include a suspension assembly or device 300 (FIG. 3) mounted in the main body 110. The suspension assembly 300 may include a coil spring (e.g., elastic members 340 and 350 in FIG. 4). The suspension assembly 300 may, via an elastic force of the coil spring 340 or 350, absorb shocks and vibrations transmitted to the wheel assembly 200 while the main body 110 travels.

The cleaner 100 may further include an ascending/descending device or assembly 400 (FIG. 3). The ascending/descending device 400 may be referred to as a height adjuster. The height adjuster 400 may be mounted to the suspension assembly 300 in order to adjust the height of the main body 110. The height adjuster 400 may be mounted to the suspension assembly 300 so as to be movable upwards or downwards, and may be coupled to the main body 110.

When the height adjuster 400 moves upwards in the suspension assembly 300, the main body 110 may also move upwards along with the height adjuster 400. When the height adjuster 400 moves downwards in the suspension assembly 300, the main body 110 may also move downwards along with the height adjuster 400. The main body 110 may thus be moved upwards or downwards by the height adjuster 400 to adjust a height of the main body 110. The height adjuster 400 and the suspension assembly 300 will be described in more detail with reference to FIGS. 3-7.

When the main body 110 travels and cleans on a hard surface of the floor, the wheel of the wheel assembly 200 and a bottom of the nozzle 120 may be maintained in close contact with the floor. However, when the main body 110 travels and cleans on a carpet laid over the floor, the wheel of the wheel assembly 200 may slip, thus impeding a traveling movement of the main body 110. In addition, the nozzle 120 may draw or pull on the carpet with a suction force, and this suction force applied between the nozzle 120 and the carpet may prevent a movement of the main body 110.

In order to solve this problem, the height adjuster 400 may adjust the height of the main body 110 depending on a "slip rate" or a rotation speed of the wheel 221 of the wheel assembly 200 or depending on information sensed from the floor via a sensor 130, and consequently the degree of contact between the bottom of the nozzle 120 and the floor may be adjusted. The "slip rate" may be calculated based on a sudden change in a rotational speed of the wheel 221, or based on a comparison of a rotational speed of the wheel 221 and a linear speed of the main body 110.

Accordingly, a smooth traveling movement of the main body 110 may be maintained regardless of how a material, texture, etc. of the floor may vary. There may also be a sensor in the wheel 221 or 222 to measure a speed or rotation of the wheel to determine a slip rate or a sudden change in speed. There may further be a sensor in the main body 110 (such as in sensor 130) to measure a linear speed of the main body 110.

As described above, the wheel 221 of the first wheel assembly 200 may be connected to the first wheel motor 210 via the first gear, and the wheel of the second wheel assembly 200 may be connected to the second wheel motor 210 via the second gear. When the first wheel motor 210 and the second wheel motor 210 are stationary, the wheels 221 of each wheel assembly 200 may not rotate. In such a state, the user may not drive or move the main body 110 in a manual mode. Therefore, in a manual mode, the wheels 221 of the first and second wheel assemblies 200 may be disconnected from the corresponding first and second wheel motors to allow the user to freely move the main body 110.

Such a connection or disconnection between the wheels 221 and the first and second wheel motors 210 may occur through at least one clutch (not shown) provided inside the main body 110. For example, a first clutch may connect a wheel 221 of the first wheel assembly 200 and the first wheel motor 210 when the main body 110 is driven in the automatic mode, and release the wheel 221 from the first wheel motor 210 when the main body 110 is driven in the manual mode. A second clutch may connect a wheel of the second wheel assembly 200 and the second wheel motor 210 when the main body 110 in the automatic mode, and release the wheel from the second wheel motor 210 in the manual mode.

The cleaner 100 may further include a battery 1 (FIG. 8) mounted to the main body 110 to supply electric power to electrical components of the cleaner 100, such as the sensor 130, camera 115, the wheel motor 210, the drive motor 410, or the suction motor. The battery 1 may be configured to be rechargeable, and may be detachably mounted to the main body 110.

A dust bin holder 112 may be provided in the main body 110. The dust bin 140, which separates and collects foreign substances from the sucked air, may be detachably coupled to the dust bin holder 112. The dust bin holder 112 may be a cavity or recess of the main body 110.

The dust bin holder 112 may be formed to have a shape that is opened toward a front or top of the main body 110, and may be indented from the front of the main body 110 toward a rear of the main body 110. Alternatively, the dust bin holder 112 may be formed to open toward a rear or side of the main body 110. As another alternative, the dust bin holder 112 may not be opened toward a front, rear, or side of the main body 110, and may instead be a recession or cavity formed downward within the main body 110. Depending on the kind of cleaner, the dust bin holder 112 may be formed at a front, rear, or side of the main body 110. For convenience of description, an example where the dust bin holder 112 is provided at and opened toward the front of the main body 110 will be described.

The dust bin 140 may be detachably coupled to (e.g., inserted and pressed-fit into) the dust bin holder 112. A portion of the dust bin 140 may be accommodated in the dust bin holder 112, and a remaining portion of the dust bin 140 may protrude from the main body 110 in a forward direction toward the front of the main body 110.

The dust bin 140 may include an inlet 142 and an outlet 143. Air containing foreign substances, e.g., dust, may be introduced through the inlet 142, and air from which dust has been separated may be discharged through the outlet 143. A first opening 116 and a second opening 117 may be formed in an inner wall of the dust bin holder 112. When the dust bin 140 is mounted in the dust bin holder 112, the inlet 142 and the outlet 143 communicate with the first and second openings 116 and 117, respectively.

An intake flow passage formed in the main body 110 may correspond to a flow passage formed from the nozzle 120 to the first opening 116, and an exhaust flow passage formed in the main body 110 may correspond to a flow passage formed from the second opening 117 to an exhaust port provided in the main body 110. As an example, the exhaust port may be provided at a rear of the main body 110.

The intake flow passage of the main body 110 may be a duct or passageway through which foreign substances sucked from the nozzle 120 may travel to ultimately enter the dust bin 140 through opening 116 and inlet 142. As an example, the intake flow passage formed in the main body 110 may be formed in a rear of the main body 110. The exhaust flow passage of the main body 110 may be a duct or passageway through which air separated from foreign substances in the dust bin 140 may exit the cleaner 100 by flowing through the outlet 143, opening 117, and ultimately to the exhaust port.

Due to this air flow connection relationship, air containing foreign substances, which is introduced through the nozzle 120, may be introduced into the dust bin 140 via the intake flow passage in the main body 110, and the foreign substances are separated from the sucked air while passing through at least one filtering member (e.g., a cyclone or a filter) provided in the dust bin 140. An interior of the nozzle 120 may be configured to allow dust to travel from a suction port of the nozzle 120 through the nozzle 120 and through the intake flow passage of the main body 110. The foreign substances will continue to pass through the intake flow passage of the main body 110 to the opening 116 and flow into the inlet 142 of the dust bin 140. The foreign substances are collected in the dust bin 140, and the air is discharged from the dust bin 140. The air may be discharged to the outside through the exhaust port after passing through the exhaust flow passage in the main body 110.

The main body 110 may include an upper cover or lid 113 configured to cover the dust bin 140 accommodated in the dust bin holder 112. The lid 113 may be hinged to the main body 110 to be rotatable. The lid 113 may cover an upper side or top of the dust bin 140 by covering an opened top of the dust bin holder 112. In addition, the lid 113 may be configured to detach or separate from the main body 110.

When the lid 113 covers the dust bin 140, the dust bin 140 may be secured to the dust bin holder 112, and the lid 113 may prevent the dust bin 140 from separating from the dust bin holder 112. The lid 113 may include a handle 114 provided on an upper or top surface of the lid 113. The handle 114 may be provided with an image-capturing device or camera 115. The camera 115 may be arranged at an incline with respect to a bottom surface of the main body 110 so as to capture and/or record an image of any surroundings ahead of and above the main body 110.

The camera 115 may be provided at the main body 110 and/or at the lid 113, and may capture an image for simultaneous localization and mapping (SLAM) of the cleaner. The image captured by the camera 115 may be used to generate a map of a traveling area or the floor, or to detect the current position within the traveling area. The camera 115 may include a sensor for such detection.

The camera 115 may generate three-dimensional coordinate information related to the surroundings of the main body 110. The camera 115 may be a three-dimensional depth camera which calculates a distance between the cleaner 100 and an object to be photographed. Accordingly, field data related to the three-dimensional coordinate information may be generated.

The camera 115 may capture a two-dimensional image related to the surroundings of the main body 110, and may generate a plurality of pieces or data points of three-dimensional coordinate information that corresponds to the captured two-dimensional image.

In an embodiment, the camera 115 may include two or more cameras to capture two-dimensional images. The two or more cameras may form a stereo vision system where two or more images captured by the two or more cameras are combined to generate three-dimensional coordinate information.

The camera 115 may include a first emission device or a first light emitter which emits light in a first pattern in a forward-and-downward direction from the main body 110. The camera 115 may further include a second emission device or a second light emitter which emits light in a second pattern in a forward-and-upward direction from the main body. The camera 115 may further include an image acquisition device which acquires an image of the surroundings ahead of the main body. Accordingly, the image acquisition device may acquire an image of a region to which the light in the first pattern and the light in the second pattern are emitted.

In another embodiment, the camera 115 may include a single camera and an infrared pattern projector to project an infrared pattern. In this case, the distance between the camera 115 and an object to be photographed may be measured by capturing the shape of the infrared pattern projected on the object to be photographed from the infrared pattern projector. This camera 115 may be an infrared (IR)-type camera.

In a further embodiment, the camera 115 may include a single camera and a light-emitting device, e.g., light-emitting diode (LED), to emit light. In this case, the distance between the camera 115 and an object to be photographed may be measured by receiving a portion of a laser beam that is reflected from the object to be photographed after being emitted from the light-emitting device and analyzing the received laser beam. This camera 115 may be a time-of-flight (TOF)-type camera.

The camera 115 may include a laser that is configured to emit a laser beam in at least one direction. For example, the camera 115 may include a first laser and a second laser. The first laser may emit linear laser beams that intersect each other, and the second laser may emit a linear laser beam. The first laser and the second laser may be linearly arranged in a vertical direction. For example, the first laser may be arranged below the second laser such that the first laser may be referred to as a "lowermost laser" and the second laser may be referred to as an "uppermost laser." In this case, the first laser may sense an obstacle located at a relatively low position on the floor, and the second laser may sense an obstacle located at a relatively high position. There may further be an intermediate laser provided between the first laser and the second laser to sense an obstacle located at an intermediate position.

The sensor 130 may be provided on the main body 110 (e.g., at a lower side or rim of the lid 113), and may be detachably coupled to the dust bin 140. The sensor 130 may detect information related to an environment or surroundings (e.g., obstacles) of the main body 110 and/or the cleaner 100, and may generate field data based on detected information.

The sensor 130 may sense the surroundings of the cleaner 100 to prevent the cleaner 100 from colliding with obstacles. As an example, the sensor 130 may sense a presence of a user around the cleaner 100. The sensor 130 may also sense a presence of objects around the cleaner 100. The sensor 130 may be configured to turn in a horizontal or lateral direction (i.e. panning) and in a vertical or longitudinal direction (i.e. tilting) to improve sensing and traveling functions of the cleaner 100. The sensor 130 may be provided at a front side of the main body 110, The sensor 130 may be provided on a lower side or rim of the lid 113, or, alternatively, on a separate member provided between the dust bin 140 and the lid 113.

The lid 113 may include a protrusion 132d (i.e., a latch, lock, or hook), which may protrude from a bottom surface of the lid 113 below the sensor 130. The dust bin 140 may include a slot or a recess 141 formed in a top surface of the dust bin 140. The slot 141 may be an opening or recess formed in an upper surface of the dust bin 140, or may alternatively be a hole that penetrates through the upper surface of the dust bin 140. The protrusion 132d may be inserted into the slot 141 so that the lid 113 may cover the top of the dust bin holder 112 and couple to the dust bin 140.

The dust bin 140 may therefore be secured and may not be separated from the main body 110.

When the lid 113 opens to expose an opened top of the dust bin holder 112, the protrusion 132d of the lid 113 may come out of the slot 141 in the dust bin 140. Accordingly, the coupling between the dust bin 140 and the lid 113 may be released, and thus the dust bin 140 may become separable from the main body 110.

The sensor 130 may include at least one of an external signal sensor, an obstacle sensor, a proximity sensor, a cliff sensor, a lower camera sensor, an upper camera sensor, an encoder, a shock sensor, or a microphone. When the sensor 130 includes an external signal sensor, the external signal sensor may sense or receive an external signal (e.g., from a charging stand or external docking device 3 or from an optional remote controller), The external signal sensor may be, for example, an infrared ray sensor, an ultrasonic sensor, or a radio frequency (RF) sensor. Accordingly, field data related to an external signal may be generated.

The cleaner 100 may receive a guide signal generated from a charging stand or external docking device 3 (FIG. 8) using the external signal sensor, and may detect information related to the location and/or direction of the external docking device 3. The external docking device 3 may transmit a guide signal to indicate the direction and distance the cleaner 100 may travel to return to the charging stand. The cleaner 100 may determine a current location and direction to the external docking device 3 relative to the cleaner 100 by receiving a signal transmitted from the external docking device 3, and may travel to the external docking device 3.

Figure 9:
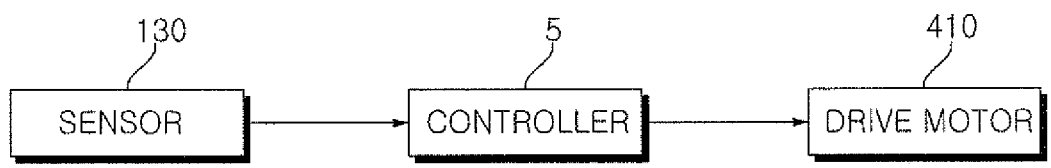
FIG. 9 is a control block diagram of the cleaner according to an embodiment.

When the sensor 130 includes an obstacle sensor, the obstacle sensor may sense an obstacle or object present ahead of the cleaner 100 or in a region toward which the cleaner 100 is directed. Accordingly, field data related to an obstacle may be generated. The obstacle sensor may transmit generated field data to a controller 5 (FIG. 9). The obstacle sensor may sense a protrusion, domestic items, furniture, a wall surface or corner, etc. that are present in a path through which the cleaner 100 moves, and may transmit related field data to the controller.

The obstacle sensor may be, for example, an infrared ray sensor, an ultrasonic sensor, an RF sensor, or a geomagnetic sensor. The cleaner 100 may use one type of sensor as the obstacle sensor, or may use two or more types of sensors in combination as needed.

The cliff sensor may use various types of optical sensors to sense an obstacle present on the floor to generate field data. The cliff sensor may be, for example, an infrared ray sensor including a light-emitting device and a light-receiving device, an ultrasonic sensor, an RF sensor, or a position-sensitive detector (PSD) sensor, like the obstacle sensor. The cliff sensor may measure a distance between the cleaner 100 and the floor to detect a presence of cliffs, steep inclines, or drop-offs in the floor surface. The cliff sensor may further measure a distance between the cleaner 100 and any irregularities or obstacles on the floor to detect raises or bumps in the floor.

For example, the cliff sensor may be a PSD sensor. However, the cliff sensor may be configured as different types of sensors. The PSD sensor may include a light-emitting device to emit an infrared ray toward an obstacle or floor. The PSD sensor may further include a light-receiving device to receive an infrared ray reflected from the obstacle or floor back to the PSD sensor, and may be typically configured in a modular form. When an obstacle is sensed by a PSD sensor, a stable measurement value may be obtained regardless of any difference in reflectance or color of an obstacle.

The controller 5 may measure an angle between (1) a light emission signal generated when the cliff sensor emits an infrared ray toward the floor and (2) a reflection signal generated when the cliff sensor receives an infrared ray reflected from an obstacle or floor. The controller 5 may thus sense the presence of a cliff, incline, or drop-off (e.g., on a stair) and obtain field data related to a depth of the cliff.

The lower camera sensor may obtain image information (e.g., field data) about the surface of the floor while the cleaner 100 is moving. The lower camera sensor may be referred to as an "optical flow sensor". The lower camera sensor may include an image sensor or camera inside of the sensor 130, and may convert a lower-side image to generate a predetermined type of image data, which may be converted to field data. As such, field data related to the image recognized through the lower camera sensor may be generated.

The controller 5 may detect a location of the cleaner using the lower camera sensor regardless of slippage of the cleaner. The controller 5 may compare and analyze image data captured by the lower camera sensor over time, may calculate a moving distance and a moving direction of the cleaner 100, and consequently may calculate a location of the cleaner 100.

The cliff sensor may also sense a material and/or texture of the floor. The cliff sensor may sense an amount of light reflected (reflectance) from the floor, and the controller 5 may determine the material of floor on the sensed reflectance. For example, when the floor is stone, e.g. marble, which has a high reflectance, the cliff sensor may sense a relatively large amount of reflected light. When the floor is wood, oilpaper, or textile (e.g. carpet), which has a lower reflectance than marble, the cliff sensor may sense a relatively small amount of reflected light. The controller 5 may thus determine the material of the floor using the reflectance of the floor sensed by the cliff sensor. If the reflectance of the floor is a predetermined reflectance value or falls within a predetermined reflectance range, the controller 5 may determine the material of the floor. For example, if the reflectance of the floor is measured to be a predetermined carpet reflectance or falls within a predetermined carpet reflectance range, the controller 5 may determine that the floor is a carpet.

In addition, the cliff sensor may sense the distance to the floor, and the controller 5 may determine the material of the floor based on the sensed distance. For example, when the cleaner is located on a carpet laid over a floor, the distance to the carpet sensed by the cliff sensor may be shorter than when the cleaner is located on a non-carpet floor. The controller 5 may thus determine the material of the floor using the distance sensed by the cliff sensor. For example, if the distance to the floor is measured to be a predetermined carpet distance or less, the controller 5 may determine that the floor is a carpet. Various sensors (a camera sensor, a current sensor, etc.) other than the cliff sensor may be used to sense the state of the area to be cleaned.

The camera sensor may capture an image of the floor, and the controller 5 may determine the material of the floor by analyzing the image captured by the camera sensor. Images of various materials may be stored in the controller in advance (i.e., pre-stored), and when the image captured by the camera sensor corresponds to one of the stored images, the controller 5 may determine the material of the floor to be a material in the corresponding image. For example, if the image captured by the camera sensor coincides with a stored image of a carpet, the controller 5 may determine that the floor is a carpet.

The current sensor may sense a current resistance value of the first or second wheel motors 210. The controller 5 may determine the material of the floor based on the current resistance value sensed by the current sensor. For example, when the nozzle 120 is located on a carpet, fibers of the carpet may be drawn into the suction port by the suction force of the nozzle 120, and this suction force applied between the carpet and the suction port may prevent the cleaner 100 from traveling smoothly. Current resistance may be generated due to a load between a rotor and a stator of the wheel motor. The current sensor may sense the current resistance value generated in the wheel motor, and the controller 5 may determine the material of the floor based on the current resistance value. For example, if the current resistance value is measured to be a predetermined carpet resistance or more, the controller 5 may determine that the floor is a carpet.

The upper camera sensor may be mounted to be oriented in toward an upward and/or forward direction from the cleaner 100, and may capture an image of the surroundings of the cleaner 100. When the cleaner 100 is provided with a plurality of upper camera sensors, the upper camera sensors may be arranged on a top surface or a side surface of the cleaner at regular intervals (for example, angle intervals relative to a fixed point or distance increments). Field data related to an image recognized or captured through the upper camera sensor may be generated.

An encoder may detect information related to an operation of the wheel motor used to operate the wheel of the wheel assembly 200. Accordingly, field data related to the operation of the wheel motor may be generated.

The shock sensor may sense shocks or impacts generated when the cleaner 100 collides with an external obstacle, wall corner, bump in the floor, etc. Accordingly, field data related to external shocks may be generated. The microphone may sense an external sound. Accordingly, field data related to external sounds may be generated.

In an embodiment, the sensor 130 may include at least one image sensor. The field data may be image information acquired by the at least one image sensor, or may feature point information extracted from the image information. However, the present disclosure is not limited thereto.

An adapter 118 may be provided at a bottom of the dust bin holder 112. The adapter 118 may be coupled to the main body 110 so as to constitute a part of the main body 110. The adapter 118 may be considered to be a part of the main body 110. The dust bin 140 may be seated on the adapter 118. The adapter 118 may serve to connect the main body 110 and the nozzle 120.

The adapter 118 may interconnect an intake flow passage in the main body 110 and an intake flow passage in the nozzle 120, In other words, the adapter 118 may be configured to allow ducts or passages of the nozzle 120 to communicate with ducts or passages of the main body 110 so that foreign substances sucked in the suction port may flow through the nozzle 120 and to the intake flow passage of the main body 110.

The nozzle 120 may be configured to suck air containing foreign substances such as dust. The nozzle 120 may further be configured to wipe the floor. A single nozzle 120 may be capable of both sucking air and wiping the floor, or separate nozzles 120 may be interchanged to perform different functions. For example, a nozzle 120 that sucks air may be referred to as a suction head or nozzle, and a nozzle 120 that wipes the floor may be referred to as a mop head or nozzle. The separate suction or mop heads may also be referred to as suction or mop modules, respectively. Embodiments disclosed herein are not limited hereto, but for convenience of description, an example including separate detachable nozzles 120, such as a suction head or mop head, will be described.

A first nozzle 120 may be a suction head detachably coupled to the main body 110. When the suction head is separated from the main body 110, a second nozzle 120 that is a mop head may be detachably coupled to the main body 110 instead of the separated suction head. Therefore, when the user wants to remove foreign substances such as dust from the floor, the user may install the suction head to the main body 110, and when the user wants to wipe the floor, the user may install the mop head to the main body 110. As an alternative embodiment, a nozzle 120 coupled to the main body 110 may be configured to perform both the function of sucking air containing foreign substances such as dust and the function of wiping the floor after the suction.

The nozzle 120 may be provided at a lower side of the main body 110. As illustrated, the nozzle 120 may be provided so as to protrude from below the main body 110, but embodiments disclosed are not limited to such a bottom placement of the nozzle 120 as long as the nozzle 120 can communicate with an intake flow passage of the main body 110. A portion of the main body 110 from which the nozzle 120 protrudes may be oriented in a direction in which the main body 110 advances, i.e. a front of the main body 110. The nozzle 120 may be provided at a position further forward than the wheel assembly 200, and may also protrude forward from below the dust bin 140 when the dust bin 140 is accommodated in the dust bin holder 112.

As illustrated, the nozzle 120 may protrude in the forward direction toward a front, and may also protrude outward to first and second sides, e.g., to the left and right, from the main body 110. A front end of the nozzle 120 may protrude forward enough so as to not contact the main body 110. The left and right sides of the nozzle 120 may extend far enough to the left and right such that left and right ends of the nozzle 120 do not contact the main body 110.

A suction motor (not shown) may be mounted inside the main body 110. An impeller (not shown) may be coupled to a rotary shaft of the suction motor. When the suction motor is operated, the impeller may be rotated along with a rotation of the rotary shaft, and the impeller may thus generate a suction force.

An intake flow passage may be formed inside the main body 110. Foreign substances such as dust may be introduced into the nozzle 120 from the floor by the suction force generated by the suction motor, and the foreign substances introduced into the nozzle 120 may be introduced into the intake flow passage and pass into the main body 110 via the adapter 118.

When the main body 110 travels in the automatic mode, the nozzle 120 may perform cleaning on the floor. The nozzle 120 may be provided at a front lower side of the main body 110 to be adjacent to the floor. When the dust bin 140 is accommodated in the dust bin holder 112, the nozzle 120 may be below the dust bin 140. The nozzle 120 may have a suction port formed on a bottom surface of the nozzle 120 to suck air. The suction port may be formed to be oriented toward the floor when the nozzle 120 is coupled to the main body 110.

The suction port may lead foreign substances through the nozzle to the intake flow passage of the main body 110 such that foreign substances may travel through the opening 116 and the inlet 142 of the dust bin 140. The nozzle 120 may be coupled to the main body 110 via the adapter 118. The nozzle 120 may communicate with the intake flow passage in the main body 110 via the adapter 118.

The nozzle 120 may include a case, which may have the suction port formed at a bottom surface thereof. A brush head or brush (not shown) may be rotatably provided inside an empty space of the case. The brush may include a rotary shaft extending in a lateral direction and a brush protruding from an outer circumferential surface of the rotary shaft. The rotary shaft of the brush may be rotatably coupled to first and second sides, e.g., left and right sides, of the case.

The case of the nozzle 120 may include a center case 121 and side cases 122 provided at first and second sides, i.e., left and right sides, of the center case 121 to form first and second surfaces, i.e., left and right surfaces, of the nozzle 120, respectively. The suction port may be formed on a bottom surface of the center case 121. The center case 121 may have openings on the left and right sides, and the side cases 122 may be coupled to, i.e., pressed-fit into, the openings of the left and right sides of the center case 121 to shield or close the openings. The center case 121 and the side cases 122 may, when coupled, form a closed case of the nozzle 120.

The brush may be provided to be exposed or protruded downwards through the suction port of the case. Accordingly, when the suction motor is operated, the brush may be rotated by the suction force to sweep foreign substances such as dust up from the floor. The swept-up foreign substances may be sucked into the case by the suction force. The brush may be made of a material that eliminates or minimizes static electricity to prevent foreign substances from easily adhering to the brush.

The adapter 118 may be coupled to a front side or bottom portion of the main body 110. The adapter 118 may interconnect the main body 110 and the nozzle 120. The nozzle 120 may be detachably coupled to the adapter 118. The adapter 118 may support a lower side or bottom of the dust bin 140.

The dust bin 140 may be detachably coupled to a front of the main body 110. The dust bin 140 may include a case or container having a hollow cylindrical shape. A filtering device (not shown) that separates foreign substances from the air sucked through the intake flow passage in the main body 110 may be provided inside the cylindrical-shaped case of the dust bin 140. The filtering device may include a plurality of filters or cyclones (e.g., centrifugal separators). The foreign substances filtered by the filtering device may drop to a bottom of the dust bin 140. While the foreign substances are contained in the dust bin 140, air separated from the foreign substances may escape out of the dust bin 140 and flow toward the suction motor by the suction force of the suction motor. The air may flow out of the outlet 143 of the dust bin 140 and enter an exhaust flow passage of the main body 110. The air may ultimately be discharged outside the main body 110 via an exhaust port.

The dust bin 140 may have an open lower surface, and the open lower surface of the dust bin 140 may be shielded by a lower lid or bottom surface 145. The lower lid 145 of the dust bin 140 may also be referred to as a dust bin lid 145 or bottom lid 145, while the lid 113 of the main body 110 may be referred to as a main lid 113, outer lid 113, upper lid 113, or top lid 113. The lower lid 145 may be rotatably coupled to the dust bin 140 in order to open or close a bottom of the dust bin 140. When the lower lid 145 is opened, an interior of the dust bin 140 may be exposed, and the foreign substances contained in the dust bin 140 may drop through the opened lower surface of the dust bin 140. A user can discard the foreign substances contained in the dust bin 140 by separating the dust bin 140 from the main body 110 and opening the lower lid 145. When the dust bin 140 is coupled to the main body 110, lower lid 145 of the dust bin 140 may be closed and seated on the adapter 118.

As described above, when the main body 110 travels on the floor in the automatic mode, the nozzle 120 may automatically clean while remaining in close contact with the floor. However, when the user wants to manually clean, the user may select the manual mode using the mode input device provided at the main body 110, separate the nozzle 120 from the main body 110, and couple a separate manual nozzle or manual nozzle head to the main body 110 to clean manually. The manual nozzle may include a long bellows-type hose and may be configured for manual cleaning, while the nozzle 120 may be configured for automatic cleaning. In this case, an end of the hose of the manual nozzle may be connected to the main body 110. In an alternative embodiment, the nozzle 120 may be a separate nozzle head configured for both automatic and manual cleaning.

As described above, the cleaner 100 according to an embodiment may include a suspension assembly 300 to absorb shocks or impacts applied to the wheel assembly 200, and an ascending/descending device or a height adjuster 400 to adjust the height of the main body 110. The height adjuster 400 may be coupled to the main body 110 and mounted to the suspension assembly 300 so as to be movable in a vertical or longitudinal direction. The suspension assembly 300 may therefore continuously absorb shocks applied to the wheel assembly 200 even during a height adjustment implemented by the height adjuster 400. In other words, since a height adjuster 400 may be separate from a suspension assembly 300, the cleaner 100 may be able to absorb shocks when the wheel assembly 200 travels over an uneven surface of the floor, regardless of an adjusted height of the main body 110. A detailed description of this configuration will now be made with reference to FIGS. 3 to 7.

Referring to FIGS. 3 to 7, the cleaner 100 according to the present disclosure may include a wheel assembly 200, a suspension assembly 300, and an ascending/descending device or height adjuster 400. The wheel assembly 200 and the suspension assembly 300 may be coupled to each other so as to constitute a "drive assembly". In other words, the "drive assembly" may include the wheel assembly 200 and the suspension assembly 300.

The wheel assembly 200 may be at least partially provided outside or below the main body 110. The wheel assembly 200 may further be provided at an outer side within the main body 110 away from a center of an interior of the main body 110. The suspension assembly 300 may be provided at a position further inward (i.e., toward an interior of the main body 110) than the wheel assembly 200. The height adjuster 400 may be provided at a position further inward than the suspension assembly 300. In other words, the wheel assembly 200 may be at an outer edge of an interior of the main body 110, the suspension assembly 300 may be positioned a bit further inward than the wheel assembly 200 toward a center of the interior, and the height adjuster 400 may be further inward than the suspension assembly 300 toward a center of the interior of the main body 110. In an alternative embodiment, the wheel assembly 200 may be provided outside the main body 110, and there may be an opening in the main body 110 to allow the wheel assembly 200 to couple to the suspension assembly 300 provided inside the main body 110.

The height adjuster 400 may be coupled to the main body 110, the suspension assembly 300 may be coupled to the height adjuster 400 in a suspended manner, and the wheel assembly 200 may be coupled to the suspension assembly 300 in a suspended manner. The wheel assembly 200 may be mounted to a first surface, e.g. outer surface, of the suspension assembly 300 so as to be vertically or longitudinally movable. The height adjuster 400 may be mounted to a second surface opposite surface the first surface, e.g. inner surface, of the suspension assembly 300 so as to be ascendable and descendable.

Figure 4:
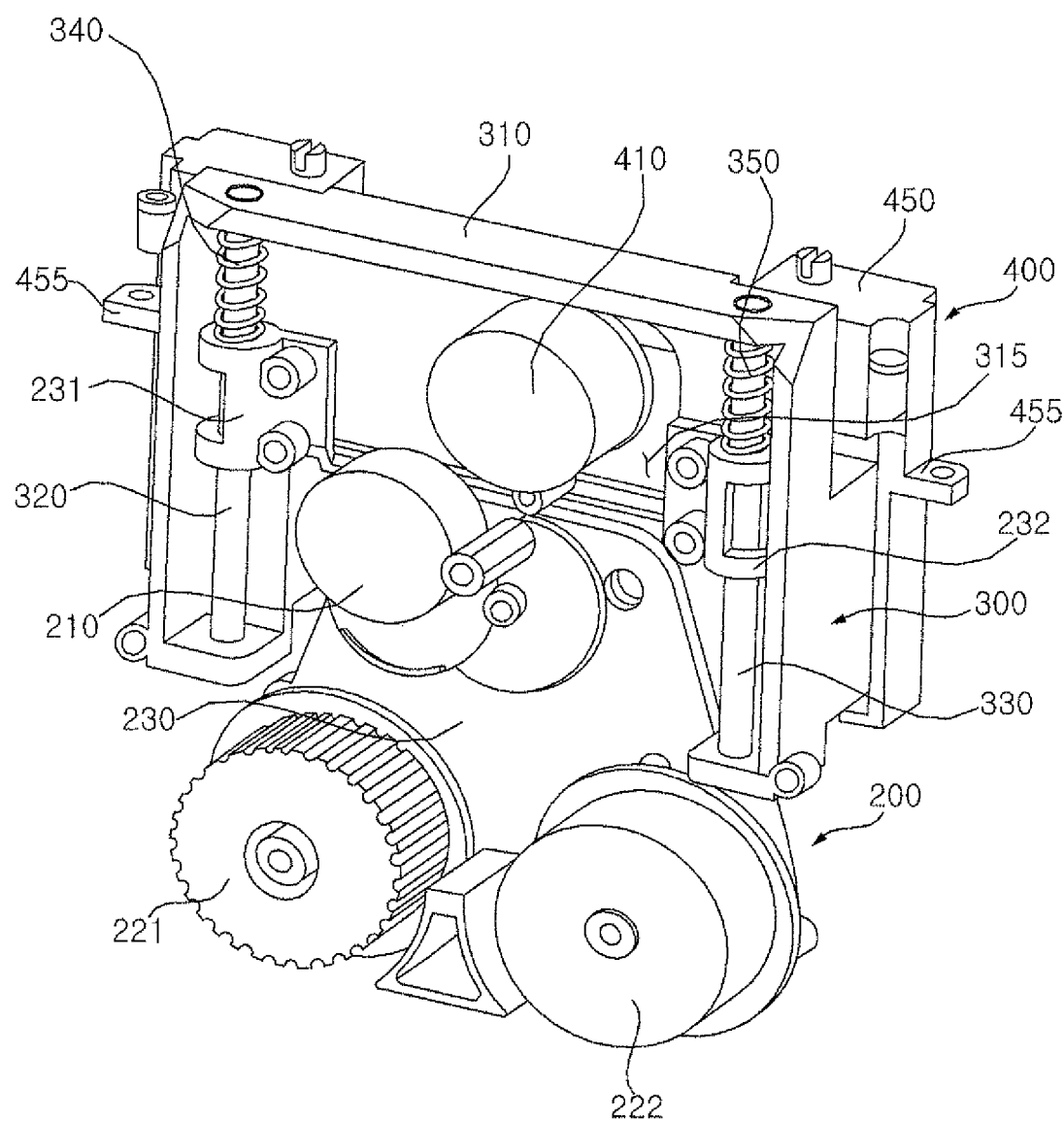
FIG. 4 is a front perspective view of FIG. 3, from which a wheel cover and a travel belt are removed.
Figure 5:
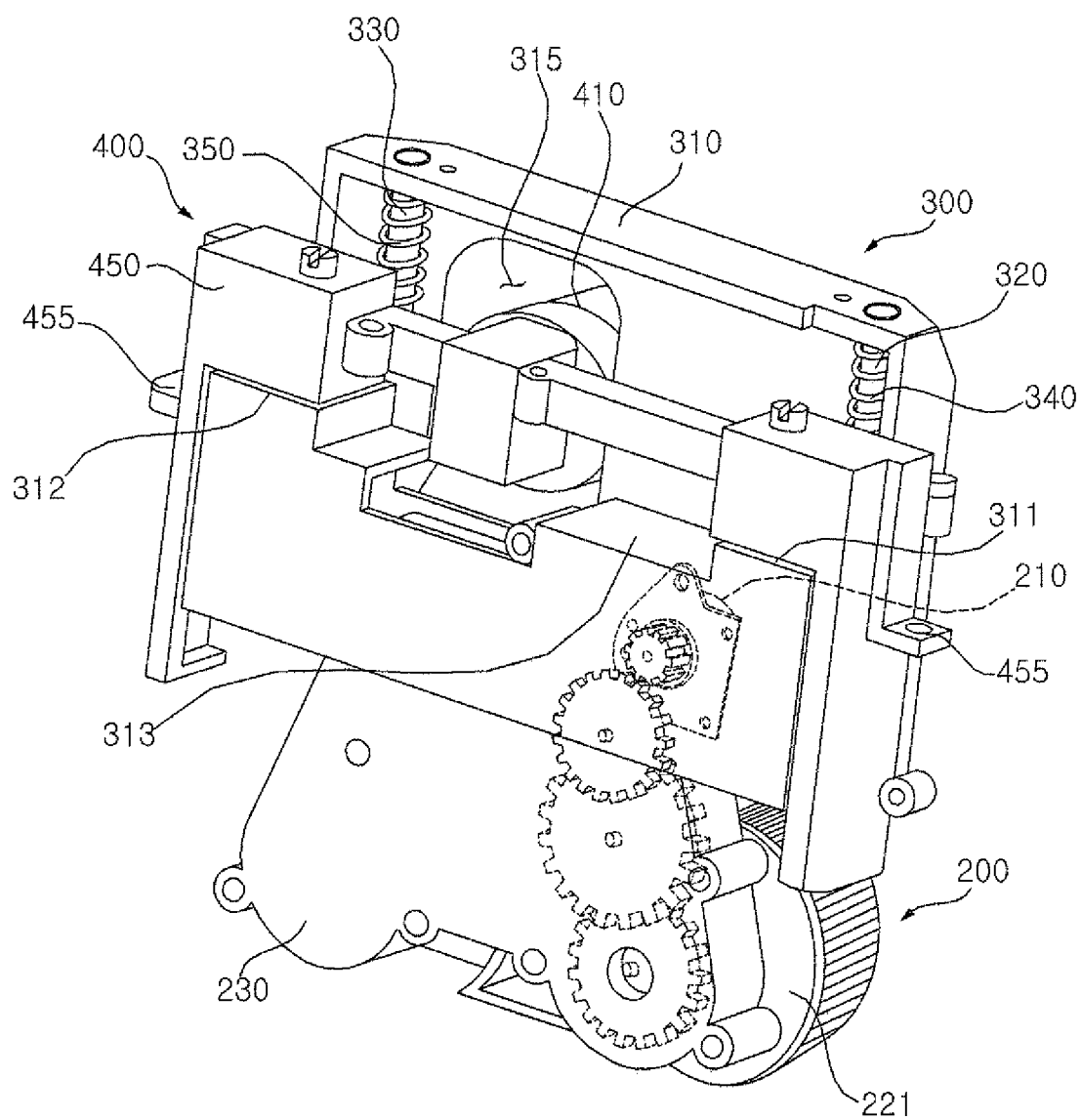
FIG. 5 is a rear perspective view of FIG. 4, which illustrates a state in which a height adjuster is moved to a lowermost position.
Figure 6:
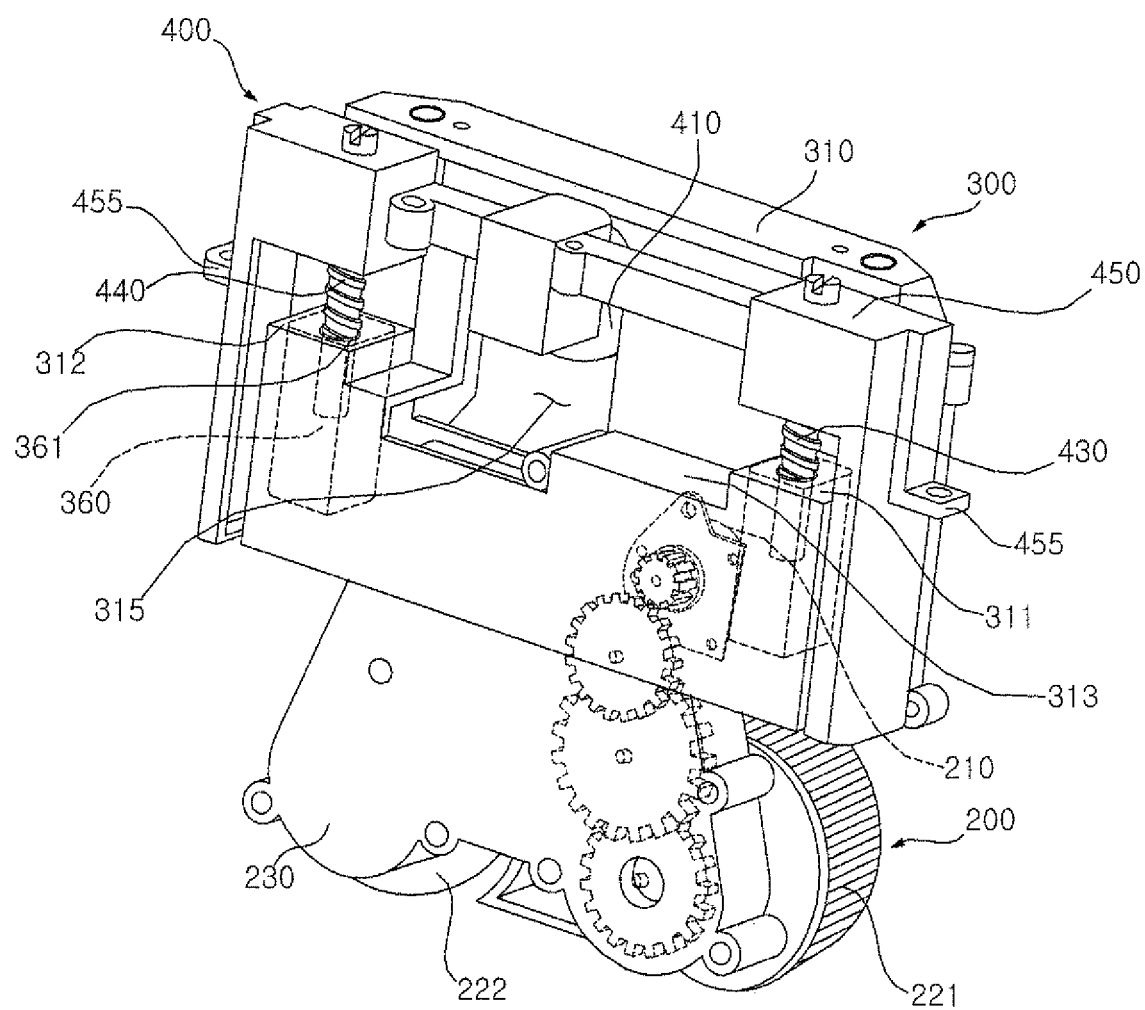
FIG. 6 is a rear perspective view of FIG. 4, which illustrates a state in which the a height adjuster is moved to an uppermost position.

The wheel assembly 200 may be mounted to each of the first and second, e.g., left and right, sides of the main body 110 so that the main body 110 can travel. The wheel assembly 200 may include a travel drive motor or wheel motor 210 and at least one wheel 221. FIGS. 4-6 illustrate an example where the wheel assembly 200 includes two wheels 221 and 222, but embodiments disclosed herein are not limited to two wheels. Each wheel 221 and 222 may be configured to be rotated by a torque of the wheel motor 210 to drive the main body 110. The wheel assembly 200 may further include a gear housing or case 230 to which the wheel motor 210 and the wheels 221 and 222 are mounted. The wheel motor 210 may be fixed to an outer side of the gear housing 230. A rotary shaft of the wheel motor 210 may be inserted into the gear housing 230 from the outer side of the gear housing 230. The gear housing 230 may include a plurality of gears configured such that a rotation of the rotary shaft of the wheel motor 210 will ultimately rotate at least one of the wheels 221 and/or 222.

The wheels 221 and 222 may support the main body 110 so that the main body 110 is movable across a floor surface. An exemplary embodiment may include a drive wheel or a driving wheel 221 provided at a front side of the gear housing 230 and a driven wheel 222 spaced apart from and behind the drive wheel 221. The driving wheel 221 and the driven wheel 222 may be connected to each other via a travel belt 223 (FIG. 3)

The driving wheel 221 may include a plurality of protrusions or ridges formed on an outer circumferential surface of the driving wheel 221. The protrusions on the driving wheel 221 may be gear teeth. The travel belt 223 may include a plurality of recesses formed in an inner circumferential surface of the travel belt 223. The protrusions formed on the outer circumferential surface of the driving wheel 221 may be inserted into the recesses formed in the inner circumferential surface of the travel belt 223. Due to a coupling of the protrusions and the recesses, when the driving wheel 221 rotates, the travel belt 223 may be rotated without slipping, and consequently the driven wheel 222 may then be rotated.

The wheel assembly 200 may further include a plurality of gears provided inside or in an interior of the gear housing 230 to connect the rotary shaft of the wheel motor 210 and the driving wheel 221. The torque of the wheel motor 210 may rotate the gears provided inside the gear housing 230, and the driving wheel 221, the travel belt 223, and the driven wheel 222 may be sequentially rotated. A wheel cover or case 240 (FIG. 3) may be coupled to the gear housing 230 to shield or protect the driving wheel 221 and the driven wheel 222. The driving wheel 221 and the driven wheel 222 may be provided between the gear housing 230 and the wheel cover 240. A first end or face (e.g., inner face) of each of the driving wheel 221 and the driven wheel 222 may be rotatably coupled to the gear housing 230, and a second end or face (e.g., outer face) of each of the driving wheel 221 and the driven wheel 222 may be rotatably coupled to the wheel cover 240.

A main feature of the cleaner 100 according to an embodiment may be an adjustable height of the main body 110. The wheel assembly 200 may be configured to allow the main body 110 to travel (e.g., in a lateral direction) and also to be mounted to the suspension assembly 300 so as to be movable vertically and absorb shocks or impacts. The wheel assembly 200 may be formed in any of various configurations as long as the wheel assembly 200 includes at least one of a rotatable wheel or a belt supported by the floor, and also as long as the wheel assembly 200 is mounted to the suspension assembly 300 so as to be movable vertically.

The suspension assembly 300 may absorb shocks or impacts transmitted from the wheel assembly 200 while the main body 110 travels. The suspension assembly 300 may include a suspension frame 310, guide bars or rods 320 and 330, and elastic members 340 and 350.

The gear housing 230 may include bar mounts or holders 231 and 232 placed on the guide bars 320 and 330 of the suspension assembly 300 so as to be movable along the guide bars 320 and 330. The bar holders 231 and 232 may further be mounted and/or fixed to the gear housing 230, and thus the wheel assembly 200 may be slideably coupled to the suspension assembly 300 via the bar holders 231 and 232 so as to be movable along the guide bars 320 and 330. The bar holders 231 and 232 may also be referred to as bar brackets.

The guide bars 320 and 330 may be mounted to an outer side of the suspension frame 310 so as to extend longitudinally or vertically. The guide bars 320 and 330 may penetrate through-holes of the bar holders 231 and 232. The bar holder 231 may be a front bar holder 231 formed at a first, e.g., front, side of the gear housing 230, and the bar holder 232 may be a rear bar holder 231 formed at a second, e.g., rear, side of the gear housing 230. The guide bar 320 may be a front bar 320 provided at a front side of the suspension frame 310, and the guide bar 330 may be a rear bar 330 provided at a rear of the suspension frame 310.

The front bar holder 231 may be mounted to or placed around the front guide bar 320 so as to be movable vertically, and the rear bar holder 232 may be mounted to or placed around the rear guide bar 330 so as to be movable vertically. FIG. 4 shows two guide bars 320 and 330 that correspond to two bar holders 231 and 232, but embodiments disclosed are not limited to having two guide bars 320 and 330 and two bar holders 231 and 232.

The elastic members 340 and 350 may be configured as coil springs through which the guide bars 320 and 330 vertically pass. Upper ends of the elastic members 340 and 350 may be supported by to the suspension frame 310, and lower ends of the elastic members 340 and 350 may be supported by the bar holders 231 and 232. If shocks are applied to the main body 110 or to the wheel assembly 200 while the main body 110 travels, the elastic members 340 and 350 may absorb the shocks by being compressed. The bar holders 231 and 232 of the wheel assembly 200 may be movable along the guide bars 320 and 330 and may support the lower sides of the elastic members 340 and 350, and the suspension assembly 300 may thus absorb shocks when the wheel assembly 200 moves vertically.

The elastic member 340 may be a front elastic member 340 through which the front bar 320 passes, and the elastic member 350 may be a rear elastic member 350 through which the rear bar 330 passes. The lower end of the front elastic member 340 may be supported by the front bar holder 231, and the rear elastic member 350 may be supported by the rear bar holder.

The height adjuster 400 may be coupled to the drive assembly (constituting the wheel assembly 200 and the suspension assembly 300) so as to be ascendable and descendable. The height adjuster 400 may further be coupled to the main body 110 to ascend or descend together with the main body 110. The height adjuster 400 may be coupled to the suspension assembly 300 so as to be ascendable and descendable. The main body 110 may thus ascend or descend along with the vertical movement of the height adjuster 400 so that a height of the main body 110 may be adjusted.

Figure 7:
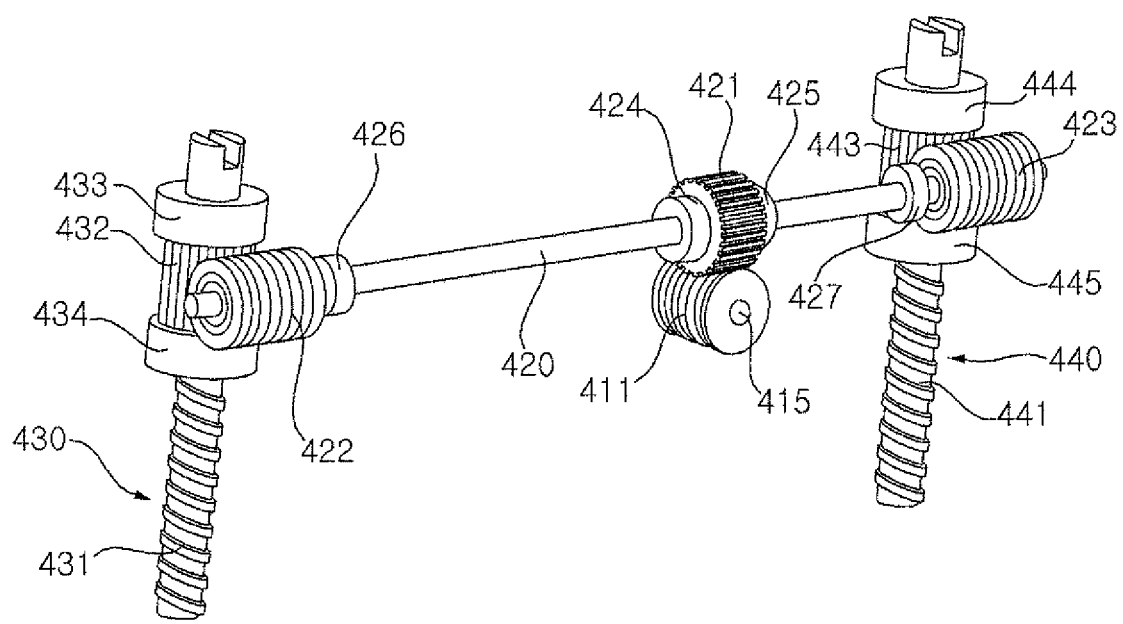
FIG. 7 is a view illustrating the configuration of a height adjuster depicted in FIGS. 3 to 6.

The height adjuster 400 may include an ascending/descending drive motor or a drive motor 410, a first rotary bar 420 (FIG. 7), and at least one secondary rotary bar 430 or 440 (FIGS. 6-7). The first rotary bar 420 may be rotated by the torque of the drive motor 410. The secondary rotary bar 430 and/or 440 may be arranged perpendicular to the first rotary bar 420. The first rotary bar 420 may be arranged so as to extend laterally or horizontally in a forward-and-backward direction, and the secondary rotary bar 430 and/or 440 may be arranged so as to extend vertically or longitudinally. The secondary rotary bar 430 and/or 440 may be rotated by the rotational force of the first rotary bar 420, and may be mounted to the suspension assembly 300 so that the main body 110 ascends or descends along with a rotation of the secondary rotary bar 430 and/or 440.

The secondary rotary bars 430 and 440 may be provided in a plural number, and the plurality of secondary rotary bars 430 and 440 may be arranged parallel to each other. In the illustrated example, there are two secondary rotary bars 430 and 440, which includes a front rotary bar 430 provided at a front of the first rotary bar 420, and a rear rotary bar 440 provided at a rear side of the first rotary bar 420. The front rotary bar 430 may be gear-meshed or tooth-engaged with a front end of the first rotary bar 420, and the rear rotary bar 440 may be gear-meshed with the rear end of the first rotary bar 420. Details of an engagement of the ends of the first rotary bar 420 with the first and second rotary bars 420 and 430 will be described in more detail with reference to FIG. 7.

The height adjuster 400 may further include a housing 450. The housing 450 may also be referred to as an inner housing, the gear housing 230 may also be referred to as an outer housing, and the suspension frame 310 may be referred to as an intermediate housing.

The first rotary bar 420 and the secondary (i.e., front and rear) rotary bars 430 and 440 may be provided in the housing 450 such that the secondary rotary bars 430 and 440 may rotate. The housing 450 may be have at least one coupling portion (e.g., a ledge or a bracket) 455 coupled to the main body 110. As an example, there may be a ledge 455 at a front of the housing 450 and a ledge 455 at a rear of the housing 450. The ledge 455 may have a fastening hole which vertically penetrates the ledge 455. A bolt or screw coupled to the main body 110 may pass through the fastening hole of the ledge 455 to secure the main body 110 to the ledge 455. However, embodiments disclosed are not limited to a ledge 455 of the height adjuster 400 and a bolt or screw of the main body 110. The main body 110 may be coupled to the housing 450 in a way that does not interfere with an ascension or descension of the housing 450 during height adjustment or in a way that does not interfere with a vertical movement of the wheel assembly 200 and/or the suspension assembly 300 during shock absorption.

The housing 450 and the main body 110 may ascend or descend together with the secondary rotary bars 430 and 440 to adjust the height of the main body 110. An ascension of the secondary rotary bars 430 and 440 will be described later with reference to FIG. 6.

The drive motor 410 may be coupled to an outer surface of the housing 450. A rotary shaft 415 (FIG. 7) of the drive motor 410 may be inserted from an outside of the housing 450 into the housing 450. A first worm 411 (FIG. 7) coupled to the rotary shaft 415 of the drive motor 410 may be provided inside the housing 450.

Figure 8:
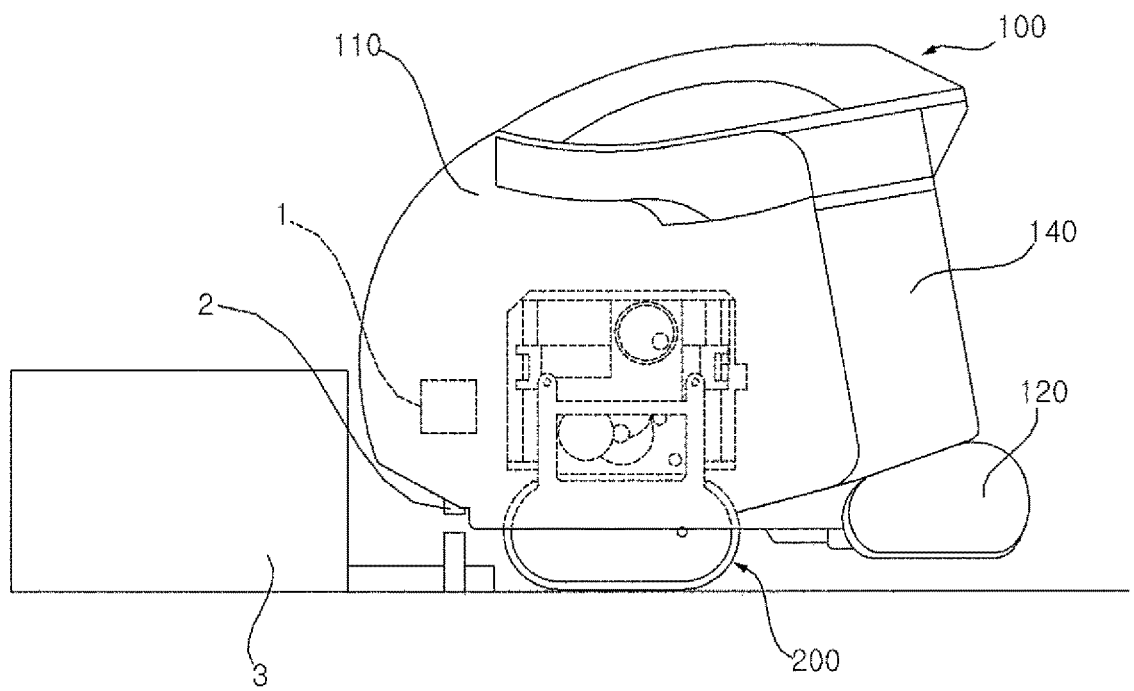
FIG. 8 is a view illustrating a state in which the cleaner according to an embodiment is docked with an external docking device.

The drive motor 410 may not be coupled to a center of the housing 450, and may instead be provided at a position biased toward either a front or rear of the housing 450. As an example, FIGS. 3-7 show the drive motor 410 positioned toward a rear center of the housing 450 on an outer side of the housing 450 away from an interior of the cleaner 100. FIG. 8 shows the drive motor 410 biased toward a front of the housing 450.

However, embodiments disclosed herein are not limited to a rear placement of the drive motor 410. The drive motor 410 may be positioned to prevent the drive motor 410 from interfering with the wheel motor 210 when the height adjuster 400 moves downwards.

The wheel motor 210 may also not be centered in the gear housing 230, but may be provided at a position biased toward a side opposite to where the drive motor 410 is positioned. As an example, FIGS. 3-7 show the wheel motor 210 positioned toward a front center of the gear housing 230 on an outer side of the gear housing 230 away from an interior of the cleaner 100. FIG. 8 shows the wheel motor 210 positioned toward a rear center of the gear housing 230.

Therefore, when the height adjuster 400 moves downwards, the drive motor 410 may not interfere or contact the wheel motor 210. As a result, a coupling between the height adjuster 400 and the main body 110 may allow smooth upward and downward motion.

The drive motor 410 may be mounted to an outer surface of the housing 450 that faces the suspension frame 310. The suspension frame 310 may have a motor hole or opening 315 into which the drive motor 410 may be inserted and/or accommodated. The motor opening 315 may be formed to have a sufficient vertical length so that the drive motor 410 may ascend or descend within the motor opening 315 when the height adjuster 400 ascends or descends.

The height adjuster 400 may be coupled to an inner surface of the suspension frame 310 toward an interior of the main body 110 so as to move vertically relative to the suspension frame 310. A bottom or lower portion of the suspension frame 310 may protrude inward toward an interior of the main body 110. A protruding portion of the suspension frame 310 may have steps or ledges 311, 312 and 313 (FIG. 5) formed in an upper or top surface of the protruding portion of the suspension frame 310. The steps 311, 312 and 313 may be formed from a front end of an inner surface of the suspension frame 310 to a rear end thereof.

The steps 311, 312, and 313 may include a front step 311 located at a front of the suspension frame 310, a rear step 312 located at a rear of the suspension frame 310, and a middle step 313 between the front step 311 and the rear step 312. The middle step 313 may connect the front step 311 and the rear step 312. The front step 311 and the rear step 312 may be formed to have the same height, but embodiments disclosed are not limited hereto. The front and rear steps 311 and 312 may have a height greater than a height of the middle step 313.

The motor opening 315 may be formed in an upper portion of the suspension frame 310 and extend into the middle step 313. The motor opening 315 may thus be three-dimensional, as it may be an opening in an outer surface of the suspension frame 310, on an upper surface of a protruding portion of the suspension frame 310, and on an inner surface of the suspension frame 310 in the protruding portion.

The height adjuster 400 may be mounted to the front and rear steps 311 and 312 so as to be movable vertically. The housing 450 may include blocks, for example, that have bottom surfaces that are shaped to correspond to upper surfaces of the front and rear steps 311 and 312. The housing 450 may further include extensions that extend downward from the blocks. When the housing 450 of the height adjuster 400 descends, the housing 450 (i.e., the blocks) may be seated on the front and rear steps 311 and 312. When the housing 450 descends to be seated on the front and rear steps 311 and 312, the housing 450 (i.e., the extensions) may surround front and rear sides of the protruding portion at a lower side of the suspension frame 310.

Embodiments disclosed are not limited to a housing 450 having block and extension shapes, and the housing 450 may have any shape that corresponds to fit on and around a protruding portion of the suspension frame 310 to reduce interference between the housing 450 and the suspension frame 310 when the height adjuster 400 ascends and descends. Therefore, sides of the housing 450 of the height adjuster 400 may overlap with sides of the suspension frame 310 to reduce an overall width of the cleaner 100, thereby increasing a space in which the height adjuster 400 may be provided in the main body 110.

Referring to FIG. 6, the first rotary bar 420 may be entirely accommodated or covered in the housing 450, whereas the secondary rotary bars 430 and 440 may be partially exposed in the housing 450 depending on a height adjustment of the height adjuster 400. The secondary rotary bars 430 and 440 may protrude from an inside of the housing 450 to extend to an outside of the housing 450. The secondary rotary bars 430 and 440 may further be inserted into the suspension frame 310 of the suspension assembly 300, Top ends of the secondary rotary bars 430 and 440 may be coupled or fixed to the housing 450 (e.g., in blocks of the housing 450), and bottom ends of the secondary rotary bars 430 and 440 may be inserted or screwed into top surfaces of the steps 311 and 312 of the suspension frame 310.

The secondary rotary bars 430 and 440 may protrude from a portion of the housing 450 that is seated on or contacts the steps 311 and 312 when the height adjuster 400 descends. The front rotary bar 430 may extend from a front of the housing 450 that is seated on the front step 311 during descension, and the rear rotary bar 440 may extend from a rear of the housing that is seated on the rear step 312 during descension.

Insertion holes 361 may be formed in the front and rear steps 311 and 312 of the suspension frame 310 of the suspension assembly 300. The front rotary bar 430 may be inserted into an insertion hole 361 of the front step 311 and the rear rotary bar 440 may be inserted into an insertion hole 361 of the rear step 312. Insulators 360, in which the insertion holes 361 are formed, may be inserted into the front and rear steps 311 and 312 to form an interior of the front and rear steps 311 and 312.

The insertion holes 361 may have threads (not illustrated) formed in inner circumferential surfaces to correspond to threads 431 and 441 (FIG. 7) formed in outer circumferential surfaces of the front and rear rotary bars 430 and 440. The threads 431 and 441 may be formed on lower portions or lower ends of the front and rear rotary bars 430 and 440 so as to mesh with the threads formed in the inner circumferential surfaces of the insertion holes 361. Therefore, when the secondary rotary bars 430 and 440 rotate in a first direction, the secondary rotary bars 430 and 440 may come out of or unscrew from the insertion holes 361, and the height adjuster 400 may ascend. Conversely, when the secondary rotary bars 430 and 440 rotate in a second direction opposite to the first direction, the secondary rotary bars 430 and 440 may be inserted or screwed into the insertion holes 361 of the front and rear steps 311 and 312, and consequently the height adjuster may 400 descend.

A change in an insertion amount of the secondary rotary bars 430 and 440 in the suspension frame 310 may correspond to a change in height of the height adjuster 400 from the insertion holes 361 of the suspension frame 310 and thus a height of the main frame 110 relative to the floor. When the height of the main frame 110 is adjusted, a distance between the nozzle 120 and the floor may also be adjusted.

The suspension frame 310 may be formed of a plastic material, whereas the secondary rotary bars 430 and 440 may be formed of stainless steel. The insulators 360 may also be formed of stainless steel to prevent damage to the suspension frame 310 during a vertical movement of the height adjuster 400 and/or the suspension frame 300. Embodiments disclosed herein are not limited to stainless steel insulators 360 and secondary rotary bars 430 and 440. The secondary rotary bars 430 and 440 may be formed of other rigid or metal materials, and the insulators 360 may be formed of the same material as the secondary rotary bars 430 and 440.

Referring to FIG. 7, the height adjuster 400 may further include a first worm 411, a first worm wheel 421, secondary worms 422 and 423, and secondary worm wheels 432 and 443. The first worm 411 may be provided at the rotary shaft 415 of the drive motor 410, and may be located inside the housing 450.

The first worm wheel 421 may be provided on the first rotary bar 420 and may be located inside the housing 450. Because the drive motor 410 may be coupled to the housing 450 at a position biased toward the rear, the first worm wheel 421 may be provided toward a rear of the first rotary bar 420 instead of being centered. The first worm wheel 421 may be gear-meshed or tooth-engaged with the first worm 411. In other words, the first worm wheel 421 may have ridges, threads, or gear teeth that engage with ridges, threads, or gear teeth of the first worm 411.

Since the first worm 411 and the first worm wheel 421 may be tooth-engaged with each other, when the rotary shaft 415 of the drive motor 410 rotates, the first rotary bar 420 may be rotated together with the rotary shaft 415 of the drive motor 410. The first rotary bar 420 may rotate around an axis (e.g., an x-axis) that is perpendicular to an axis (e.g., a y-axis) around which the rotary shaft 415 may rotate.

The secondary worms 422 and 423 are provided at ends of the first rotary bar 420 and are located inside the housing 450. When the first rotary bar 420 is rotated, the second worms 422 and 423 are rotated together with a rotation of the first rotary bar 420. The secondary worms 422 and 423 may rotate around the same axis around which the rotary bar 420 rotates (i.e., the x-axis). Because the secondary rotary bars 430 and 440 may be two in number (the front rotary bar 430 and the rear rotary bar 440), there may be two secondary worms 422 and 423 provided at front and rear ends of the first rotary bar 420. Secondary worm 422 may be a front worm 422 provided at a front of the first rotary bar 420, and secondary worm 433 may be a rear worm 423 provided at a rear of the first rotary bar 420.

The secondary worm wheels 432 and 443 may be provided at upper portions or ends of the secondary rotary bars 430 and 440 and may be located inside the housing 450. The lower ends of the secondary rotary bars 430 and 440 having the threads 431 and 441 may extend from the secondary worm wheels 432 and 433 to be inserted into the insertion holes 361 in the suspension frame 310. Secondary worm wheel 432 may be a front worm wheel 432 provided at or on the front rotary bar 430, and secondary worm wheel 443 may be a rear worm wheel 443 provided at or on the rear rotary bar 440.

The front worm wheel 432 may be gear-meshed or tooth-engaged with the front worm 422, and the rear worm wheel 443 may be gear-meshed or tooth-engaged with the rear worm 423. When the first rotary bar 420 is rotated, the secondary rotary bars 430 and 440 are rotated together with the first rotary bar 420. The secondary rotary bars 430 and 440 may rotate around an axis (e.g., a z-axis) that is perpendicular to the axes around which the first rotary bar 420 and the rotary shaft 415 rotate (i.e., the x-axis and the y-axis).

That is, when the rotary shaft 415 of the drive motor 410 rotates, the first rotary bar 420 and the secondary rotary bars 430 and 440 may also rotate. When the rotary shaft 415 of the drive motor 410 rotates in a first direction, the first rotary bar 420 and the secondary rotary bars 430 and 440 may also rotate in directions corresponding to the first direction. When the rotary shaft 415 of the drive motor 410 rotates in the second direction opposite the first direction, the first rotary bar 420 and the secondary rotary bars 430 and 440 may rotate in directions corresponding to the second direction.

The first worm wheel 421 and the secondary worms 422 and 423 may be formed integrally with the first rotary bar 420. As an example, the first worm wheel 421, the secondary worms 422 and 423, and the first rotary bar 420 may be integrally formed of stainless steel. Alternatively, the first worm wheel 421 and the secondary worms 422 and 423 may be formed separately from the first rotary bar 420, and may be coupled to the first rotary bar 420. Therefore, the term "provided" used above to describe the relationship of the first worm wheel 421 and the secondary worms 422 and 423 with respect to the first rotary bar 420 may describe both embodiments of integral formation and separate formation.

Similarly, the secondary worm wheels 432 and 443 may be formed integrally with the secondary rotary bars 430 and 440, respectively. The threads 431 and 441 may also be formed integrally with the secondary rotary bars 430 and 440, respectively. As an example, the front worm wheel 432, the threads 431 and the front rotary bar 430 may be integrally formed of stainless steel, and the rear worm wheel 443, the threads 441, and the rear rotary bar 440 may also be integrally formed of stainless steel. Alternatively, the second worm wheels 432 and 443 and the threads 431 and 441 may be formed separately from the secondary rotary bars 430 and 440, and may be coupled to the secondary rotary bars 430 and 440. Therefore, the term "provided" used above to describe the relationship of the second worm wheels 432 and 443 with respect to the secondary rotary bars 430 and 440 may describe both embodiments of integral formation and separate formation.

The height adjuster 400 may further include a plurality of bearings 424, 425, 426, 427, 433, 434, 444 and 445 which allow the first rotary bar 420 and the secondary rotary bars 430 and 440 to rotate within the housing 450 and reduce friction. As shown in FIG. 7, bearings 424 and 425 may be provided on the first rotary bar 420 near sides of the first worm wheel 421, bearing 426 may be provided on the first rotary bar 420 near an inner side of the front worm 422, bearing 427 may be provided on the first rotary bar 420 near an inner side of the rear worm 423, bearings 433 and 434 may be provided on the front rotary bar 430 near sides of the front worm wheel 432, and bearings 444 and 445 may be provided on the rear rotary bar 440 near sides of the rear worm wheel 443.

The bearings 424, 425, 426, 427, 433, 434, 444 and 445 may be coupled to a heavier, or the heaviest, sections of each of the first rotary bar 420 and the secondary rotary bars 430 and 440, respectively, in order to ensure smooth rotation of the first rotary bar 420 and the secondary rotary bars 430 and 440. Therefore, bearings 424 and 425 may be coupled to sections of the first rotary bar 420 that are adjacent to the first worm wheel 421, bearings 433, 434, 444, and 445 may be coupled to sections of the secondary rotary bars 430 and 440 that are adjacent to the second worm wheels 432 and 443, respectively. Bearings 425 and 427 may further be coupled to sections of the first rotary bar 420 that are adjacent to the front and rear worms 422 and 423, respectively.

The bearings 424, 425, 426, 427, 433, 434, 444 and 445 may include a first bearing 424 coupled to the first rotary bar 420 at a section adjacent to a front end of the first worm wheel 421, a second bearing 425 coupled the first rotary bar 420 at a section adjacent to the rear end of the first worm wheel 421, a third bearing 426 coupled to the first rotary bar 420 at a section adjacent to a rear end of the front worm 422, a fourth bearing 427 coupled to the first rotary bar 420 at a section adjacent to a front end of the rear worm 423, a fifth bearing 433 coupled to the front rotary bar 430 at a section adjacent to an upper end of the front worm wheel 432, a sixth bearing 434 coupled to the front rotary bar 430 at a section adjacent to a lower end of the front worm wheel 432, a seventh bearing 444 coupled to the rear rotary bar 440 at a section adjacent to an upper end of the rear worm wheel 443, and an eighth bearing 445 coupled to the rear rotary bar 440 at a section adjacent to a lower end of the rear worm wheel 443.

Referring to FIGS. 6 and 7, the housing 450 may have blocks that are seated on the front and rear steps 311 and 312. The blocks may have an interior space to allow rotation of the secondary rotary bars 430 and 440. The blocks may be supported on or coupled to the secondary rotary bars 430 and 440 (for example, at or near the bearings 433, 434, 444, and 445) in a way that reduces friction. Thus, the secondary rotary bars 430 and 440 may freely rotate to insert into and unscrew out of the insertion holes 360 of the front and rear steps 311 and 312 of the suspension frame 310, and the housing 450 may ascend and descent with an insertion and unscrewing of the secondary rotary bars 430 and 440.

There may also be a middle section of the housing 450 having an interior space that accommodates or covers the first rotary bar 420. This middle section may not interfere with a rotation of the first rotary bar 420. The middle section of the housing 450 may not contact the drive motor 410 or interfere with a rotation of the drive motor 410 and/or the first rotary shaft 415.

An interior of the housing 450 may include insertion holes or spaces through which upper ends of the secondary rotary bars 430 and 440 may be inserted. An interior of the housing 450 may have sufficient space to minimize friction between the first and secondary rotary bars 420, 430, and 440 and the housing 450 when the first and secondary rotary bars 420, 430, and 440 rotate.

FIG. 8 is a view illustrating a state in which the cleaner according to an embodiment of is docked with an external docking device, and FIG. 9 is a control block diagram of the cleaner according to an embodiment. Referring to FIGS. 8 and 9, the cleaner 100 may include a battery 1 provided inside the main body 110. The battery 1 may store electrical or chemical energy to drive various electrical components (i.e., the wheel motor 210, the drive motor 410, the suction motor, the sensor 130, and/or the camera 115) provided at the main body 110.

A charging terminal 2 to charge the battery 1 may be provided on a bottom surface of the main body 110. The charging terminal 2 may have a predetermined structure or configuration that enables connection to an external docking device or charging stand 3 to charge the battery 1. For example, the charging terminal 2 may be connected to a supply terminal 4 provided at the external docking device 3 in order to charge the battery 1. The docking device 3 may be a charging stand, and may be referred to as a charger. When a charge of the battery 1 drops below a predetermined charge level, the cleaner 100 may travel autonomously to the docking device 3, and the main body 110 may be docked with the docking device 3 when the charging terminal 2 connects to the supply terminal 4. In addition, when the cleaner 100 finishes a cleaning operation, the cleaner 100 may travel autonomously to and dock with the docking device 3 regardless of a charge of the battery 1.

As previously described, the sensor 130 may include various sensors, including at least one of an obstacle sensor, a floor sensor, or a position sensor. Referring to FIG. 9, a controller 5 may control the height adjuster 400 to ascend or descent in response to sensed values transmitted from the sensor 130.

For example, the controller 5 may receive information related to a location of the docking device 3 from the sensor 130 in order to verify the location of the docking device 3. Due to a configuration of the charging terminal 2 within the main body 110, when the main body 110 intends or is set to be docked with the docking device 3, the controller 5 may control the cleaner 100 to rotate the drive motor 410 in a first direction to ascend the height adjuster 400, raising the main body 110 to prevent a collision between the charging terminal 2 and the docking device 3 and/or the supply terminal 4. After the height adjuster 400 ascends, the controller 5 may then control the cleaner 100 to rotate the drive motor 410 in a second direction opposite to the first direction to descend the height adjuster 400, lowering the main body 110 to connect the charging terminal 2 with the supply terminal 4.

As previously described, the nozzle 120 may include a suction port formed on a bottom surface of the nozzle 120 to suck foreign substances from the floor. When the cleaner 100 travels on a carpet laid over a floor, fibers of the carpet may be drawn into the suction port by the suction force of the nozzle 120, and this suction force applied between the carpet and the suction port may impede a movement or traveling of the cleaner 100. Therefore, the controller 5 may move the height adjuster 400 upwards or downwards by controlling the drive motor 410 depending on a material of the floor, thereby adjusting the height of the nozzle 120.

As previously described, the sensor 130 may acquire information related to the material of the floor, and the controller 5 may receive the information about the floor from the sensor 130. The sensor 130 may be or include at least one of a distance sensor, a reflectance measuring sensor, or an image sensor to acquire information related to the floor material. The controller 5 may determine the material of the floor based on the information received or transmitted from the sensor 130.

When the controller 5 determines that the floor is a carpet based on received information from the sensor 130, the controller 5 may control the drive motor 410 to rotate in the first direction to ascend the height adjuster 400 and raise the nozzle 120, which may be coupled to the main body 110. When the controller 5 determines that the main body 110 no longer contacts the carpet or that the nozzle 120 is a predetermined distance from the carpet based on received information about the floor from the sensor 130, the controller 5 may control the drive motor 410 to rotate in the second direction to descend the height adjuster 400 and lower the nozzle 120.

The controller 5 may also control the height adjuster 400 based on information from the current sensor in the sensor 130, the speed of the wheels 221 and 222 in the wheel assembly 200, or a calculated slip rate of the wheel assembly 200, as previously described. The controller 5 may be configured to control the cleaner 100 to raise or lower the height adjuster 400 based on any sensed information sensed from any one of the various sensors in the sensor 130 or based on information in the camera 115, The controller 5 may thus control a contact between the nozzle 120 and the floor to optimize a movement and cleaning performance of the cleaner 100.

As described above, the cleaner 100 according to an embodiment may be configured such that the height adjuster 400 to raise or lower the main body 110 may be mounted to the suspension assembly 300. Therefore, even when the height of the main body 110 is adjusted by the height adjuster 400, the suspension assembly 300 may continue to absorbing shocks or impacts applied to the wheel assembly 200.

In addition, the suspension frame 310 of the suspension assembly 300 includes the steps 311, 312 and 313 on which the housing 450 of the height adjuster 400 is seated when the height adjuster 400 descends. Therefore, when the height adjuster 400 is mounted to the suspension assembly 300, the overall widths of the height adjuster 400 and the suspension assembly 300 may be decreased, thereby ensuring the height adjuster 400 fits inside the main body 110.

Embodiments disclosed herein may provide a cleaner in which an ascending/descending unit or height adjuster for moving a cleaner body or a main body upwards or downwards is mounted to a suspension unit or assembly. Therefore, even when a height of the main body is adjusted by the height adjuster, the suspension assembly may be capable of continuously absorbing shocks applied to a wheel unit or assembly.

In addition, when a cleaning nozzle or nozzle sucks foreign substances or dust from a carpet, the height of the nozzle may be increased, thereby preventing fibers of the carpet from being drawn into a suction port formed at the bottom surface of the nozzle and consequently optimizing a traveling performance or movement of the main body.

In addition, when the cleaner intends or is set to be docked with an external docking device to charge a battery, the main body may be moved upwards or raised so that a charging terminal provided at the bottom surface or a bottom of the main body is located at a position enabling connection to the docking device.

In addition, a suspension frame of the suspension assembly may include stepped portions or steps on which an ascending/descending housing or housing of the height adjuster is seated when the height adjuster descends. Therefore, when the height adjuster is mounted to the suspension assembly, the overall widths of the height adjuster and the suspension assembly may be decreased, thereby ensuring sufficient space in which the height adjuster may be provided in the main body.

Embodiments disclosed herein may provide a cleaner in which a cleaner body or a main body is configured to be ascendable and descendable with respect to a unit or assembly provided to absorb shocks applied to a wheel unit or assembly, thereby enabling the suspension assembly to continuously absorb shocks even when the height of the main body is adjusted.

When a main body provided at a bottom surface or bottom of the cleaner includes a charging terminal that is docked with an external docking device to charge a battery provided inside the main body, the main body may ascend so that the charging terminal is located at a position enabling connection to the docking device or so that the charging terminal does not collide with the docking device.

When a cleaning nozzle or nozzle having a suction port formed in the bottom surface of the cleaner may clean a carpet, the nozzle may ascends so as to prevent fibers of the carpet from being drawn into the suction port.

When an ascending/descending unit or a height adjuster that allows the main body to ascend or descend is mounted to a unit or assembly, the overall widths of the height adjuster and the suspension assembly may be decreased, thereby securing space for providing the height adjuster in the cleaner body.

Embodiments disclosed herein may include a cleaner including a cleaner or main body, a wheel unit or assembly including a wheel or roller configured to support the main body so that the main body travels on an area to be cleaned or ground or floor, and a unit or assembly to which the wheel assembly may be mounted so as to be movable vertically. The suspension assembly may be configured to absorb shocks or impacts when the wheel assembly moves vertically. The cleaner may further include an ascending/descending unit or height adjuster mounted to the suspension assembly so as to be ascendable and descendable. The height adjuster may be coupled to the main body so as to ascend or descend together with the main body.

The height adjuster may include an ascending/descending drive motor or drive motor, a first rotary bar configured to be rotated by a torque of the drive motor, and at least one second rotary bar or secondary rotary bars arranged perpendicular to the first rotary bar so as to be rotated by a rotational force of the first rotary bar, the secondary rotary bars being mounted to the suspension assembly so that the main body ascends or descends along with a rotation of the secondary rotary bars.

The height adjuster may further include an ascending/descending housing or housing in which the first rotary bar and the secondary rotary bars are rotatably mounted, the housing being coupled to the main body so as to ascend or descend together with the secondary rotary bars.

The first rotary bar may be accommodated in the housing, and the secondary rotary bars may have ends or one end portion protruding from an inside of the housing to the outside of the housing and inserted into the suspension assembly.

The suspension assembly may have therein an insertion hole into which ends or end portions of the secondary rotary bars are mounted via insertion. There may be threads formed in an inner circumferential surface of the insertion hole, and the secondary rotary bars may have threads formed in outer circumferential surfaces of the end portions of the secondary rotary bars so as to be meshed with the threads formed in the insertion hole.

The suspension assembly may include a suspension frame, at least one guide bar mounted to the suspension frame so as to extend vertically. The wheel assembly may be mounted to the at least one guide bar so as to be movable vertically. The suspension assembly may include at least one elastic member through which the at least one guide bar passes. The at least one elastic member may be configured to absorb shocks when the wheel assembly moves vertically. The insertion hole may be formed in the suspension frame. The suspension assembly may further include an insulator in which the insertion hole is formed, the insulator being coupled to the suspension frame.

The suspension frame may have therein an ascending/descending hole or opening into which the drive motor may be inserted or accommodated. The drive motor may be provided outside the housing, and may ascend or descend within the opening when the height adjuster ascends or descends.

The suspension frame may have a stepped portion or steps formed such that a lower portion of a surface of the suspension frame that faces an interior of the main body protrudes further than an upper portion thereof, and a portion of the housing through which the secondary rotary bars protrude to an outside of the housing may be seated on the steps when the height adjuster descends. The height adjuster may further include a plurality of bearings to allow the first rotary bar and the secondary rotary bars to be rotatably coupled to the housing.

The height adjuster may further include a first worm provided at a rotary shaft of the drive motor, a first worm wheel provided at the first rotary bar and tooth-engaged with the first worm, a second worm provided at the first rotary bar, and a second worm wheel provided at the secondary rotary bars and tooth-engaged with the second worm.

The first worm wheel and the second worm may be formed integrally with the first rotary bar. The second worm wheel may be formed integrally with the secondary rotary bars.

The secondary rotary bars may include a plurality of secondary rotary bars, and the secondary rotary bars may be arranged parallel to each other. The first rotary bar may be arranged in a horizontal or lateral direction, and the secondary rotary bars may be arranged in a vertical or longitudinal direction.

The cleaner may further include a sensing unit or sensor including at least one of an obstacle sensor, a floor sensor, a position sensor, a depth sensor, a cliff sensor, a proximity sensor, or a camera, and a controller configured to perform control in response to sensed values transmitted from the sensor so that the height adjuster ascends or descends.

The cleaner may further include a charging terminal having a predetermined configuration enabling connection to an external docking device for charging and provided on the bottom surface or bottom of the main body. When the main body intends or is set to be docked with the docking device, the controller may perform control such that the height adjuster ascends so that the main body is moved upwards or raised.

After the height adjuster ascends, the controller may perform control such that the height adjuster descends so that the main body is moved downwards or lowered and the charging terminal is connected to the docking device. The docking device may include a supply terminal with which the charging terminal may connect to charge a battery provided in the main body.

The cleaner may further include a cleaning nozzle or nozzle coupled to the main body and having a suction port formed in the bottom surface thereof to suck foreign substances or dust from an area to be cleaned or a floor. Upon determining that the floor is a carpet based on information about the floor sensed by a floor sensor or the sensor, the controller may perform control such that the height adjuster ascends so that the nozzle is moved upwards, raised, or lifted.

Upon determining that the main body has left the carpet or no longer contacts the carpet based on the information about the floor, the controller may perform control such that the height adjuster descends so that the nozzle is moved downwards or is lowered.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily ail referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cleaner comprising:
   a main body having a bottom;
   a wheel assembly including at least one wheel configured to support and move the main body over a surface;
   a suspension assembly coupled to the wheel assembly, the suspension assembly being configured to absorb shocks when the wheel assembly moves over uneven surfaces; and
   a height adjuster coupled to the main body, wherein the height adjuster is configured to change a distance between the bottom of the main body and the surface,
   wherein the height adjuster comprises:
   a drive motor;
   a first rotary bar configured to be rotated by a torque of the drive motor;
   at least one secondary rotary bar arranged perpendicular to the first rotary bar so as to be rotated by a rotation of the first rotary bar, the at least one secondary rotary bar being coupled to the suspension assembly so that the distance between the bottom of the main body and the surface changes along with a rotation of the at least one secondary rotary bar; and
   a housing in which the first rotary bar and the at least one secondary rotary bar are provided, the housing being coupled to the main body such that the main body and the housing move together when the at least one secondary rotary bar rotates,
   wherein the first rotary bar is accommodated in the housing, and the at least one secondary rotary bar protrudes from inside of the housing to an outside of the housing and is inserted into the suspension assembly,
   wherein the suspension assembly has an insertion hole having threads formed in an inner circumferential surface of the insertion hole, the at least one secondary rotary bar has threads formed in an outer circumferential surface of the at least one secondary rotary bar, and
   wherein the at least one secondary rotary bar is inserted into the insertion hole so that the threads of the at least one secondary rotary bar engage with the threads formed in the insertion hole,
wherein the suspension assembly comprises:
a suspension frame;
at least one guide bar coupled to the suspension frame, the wheel assembly being coupled to the at least one guide bar so as to be moveable along the at least one guide bar;
and an elastic member through which the at least one guide bar passes, the elastic member being configured to absorb shocks when the wheel assembly moves over uneven surface.

2. The cleaner according to claim 1, wherein the height adjuster is coupled to the suspension assembly, and the height adjuster is configured to ascend and descend such that the main body ascends when the height adjuster ascends, and the main body descends when the height adjuster descends.

3. The cleaner according to claim 1, wherein the suspension assembly further comprises an insulator in which the insertion hole is formed, the insulator being coupled to the suspension frame.

4. The cleaner according to claim 1, wherein the suspension frame includes a motor opening, and wherein the drive motor is provided outside the housing, is inserted into the motor opening, and moves within the motor opening when the height adjuster moves.

5. The cleaner according to claim 1, wherein a lower section of the suspension frame protrudes past an upper section of the suspension frame, wherein a top surface of the lower section of the suspension frame is stepped, and wherein a section of the housing from which the at least one secondary rotary bar protrudes is seated on the top surface of the lower section of the suspension frame when the at least one secondary rotary bar is completely inserted into the suspension frame.

6. The cleaner according to claim 1, wherein the height adjuster comprises a plurality of bearings that allow the first rotary bar and the at least one secondary rotary bar to rotate within the housing.

7. The cleaner according to claim 1, wherein the height adjuster comprises:
a first worm provided at a rotary shaft of the drive motor;
a first worm wheel provided at the first rotary bar, the first worm wheel being tooth-engaged with the first worm;
at least one secondary worm provided at the first rotary bar; and
at least one secondary worm wheel provided at the at least one secondary rotary bar, the at least one secondary worm wheel being tooth-engaged with the at least one secondary worm.

8. The cleaner according to claim 7, wherein the first worm wheel and the at least one secondary worm are formed integrally with the first rotary bar, and the at least one secondary worm wheel is formed integrally with the at least one secondary rotary bar.

9. The cleaner according to claim 1, further comprising a plurality of secondary rotary bars, wherein the plurality of secondary rotary bars are arranged parallel to each other.

10. The cleaner according to claim 1, wherein the first rotary bar is arranged in a horizontal direction, and the at least one secondary rotary bar is arranged in a vertical direction.

11. The cleaner according to claim 1, further comprising:
a sensor having at least one of an obstacle sensor, a floor sensor, or a position sensor to sense information about the floor; and a controller configured to ascend or descend the height adjuster in response to sensed values transmitted from the sensor.

12. The cleaner according to claim 11, further comprising:
a charging terminal configured to connect to an external docking device, the charging terminal being provided on the bottom of the main body, wherein, when the main body is set to be docked with the external docking device, the controller adjusts the height adjuster to increase a distance between the charging terminal and the surface.

13. The cleaner according to claim 12, wherein, after the height adjuster is adjusted and the charging terminal is at a predetermined position relative to the external docking device, the controller adjusts the height adjuster to decrease the distance between the charging terminal and the surface and connect the charging terminal to the external docking device.

14. The cleaner according to claim 11, further comprising:
a nozzle coupled to the main body, the nozzle having a suction port formed in a bottom surface of the nozzle to suck foreign substances from the surface, wherein, when the controller determines that the surface is a carpet based on information about the surface sensed by the sensor, the controller adjusts the height adjuster to increase a distance between the nozzle and the carpet.

15. The cleaner according to claim 14, wherein, when the controller determines that the main body is a predetermined distance above the carpet based on the sensed information about the surface, the controller adjusts the height adjuster decrease the distance between the nozzle and the carpet.

* * * * *